US008869270B2

(12) United States Patent
Touboul

(10) Patent No.: US 8,869,270 B2
(45) Date of Patent: Oct. 21, 2014

(54) SYSTEM AND METHOD FOR IMPLEMENTING CONTENT AND NETWORK SECURITY INSIDE A CHIP

(75) Inventor: Shlomo Touboul, Kefar Haim (IL)

(73) Assignee: Cupp Computing AS, Oslo (NO)

(*) Notice: Subject to any disclaimer, the term of this patent is extended or adjusted under 35 U.S.C. 154(b) by 421 days.

(21) Appl. No.: 12/402,443

(22) Filed: Mar. 11, 2009

(65) Prior Publication Data

US 2009/0249465 A1 Oct. 1, 2009

Related U.S. Application Data

(60) Provisional application No. 61/039,729, filed on Mar. 26, 2008.

(51) Int. Cl.
| | |
|---|---|
| *G06F 21/57* | (2013.01) |
| *H04W 12/12* | (2009.01) |
| *H04L 29/06* | (2006.01) |
| *H04W 12/08* | (2009.01) |

(52) U.S. Cl.
CPC ............. *H04W 12/12* (2013.01); *G06F 21/57* (2013.01); *H04L 63/0227* (2013.01); *H04W 12/08* (2013.01)
USPC ................... 726/22; 726/23; 726/24; 726/25; 726/1; 726/11; 726/12; 726/13; 726/14

(58) Field of Classification Search
None
See application file for complete search history.

(56) References Cited

U.S. PATENT DOCUMENTS

| | | | |
|---|---|---|---|
| H1944 H | 2/2001 | Cheswick et al. | |
| 6,466,779 B1 | 10/2002 | Moles et al. | |
| 6,772,345 B1 | 8/2004 | Shetty | |
| 6,813,682 B2 | 11/2004 | Bress et al. | |
| 7,065,644 B2 | 6/2006 | Daniell et al. | |
| 7,069,330 B1 | 6/2006 | McArdle et al. | |
| 7,076,690 B1 | 7/2006 | Todd et al. | |
| 7,086,089 B2 | 8/2006 | Hrastar et al. | |
| 7,184,554 B2 | 2/2007 | Freese | |
| 7,283,542 B2 | 10/2007 | Mitchell | |
| 7,353,533 B2 | 4/2008 | Wright et al. | |
| 7,359,983 B1 | 4/2008 | Maufer et al. | |
| 7,360,242 B2 | 4/2008 | Syvänne | |

(Continued)

FOREIGN PATENT DOCUMENTS

| | | |
|---|---|---|
| WO | 0078008 | 12/2000 |
| WO | 2004030308 | 4/2004 |

OTHER PUBLICATIONS

Kent et al. "Security Architecture for the Internet Protocol", Dec. 2005, I.E.T.F. Network Working Group, RFC 4301, pp. 10-11.*

(Continued)

*Primary Examiner* — Jung Kim
*Assistant Examiner* — Adrian Stoica
(74) *Attorney, Agent, or Firm* — Sheppard, Mullin, Richter & Hampton LLP

(57) ABSTRACT

Systems and methods for implementing content, streaming, and network security inside a chip or inside a computing device are disclosed. In exemplary embodiments, a system comprises a communication chip and a second processor. The communication chip comprises a router and security instructions. The router is configured to intercept untrusted data between a network, and a first router. The second processor is configured to receive the untrusted data from the router, process the untrusted data with the security instructions to produce trusted data, and provide the trusted data to the router.

26 Claims, 16 Drawing Sheets

(56) References Cited

U.S. PATENT DOCUMENTS

| | | | |
|---|---|---|---|
| 7,418,253 B2 | 8/2008 | Kavanagh | |
| 7,539,828 B2 | 5/2009 | Lomnes | |
| 7,657,941 B1 | 2/2010 | Zaitsev | |
| 7,984,479 B2 | 7/2011 | Brabson et al. | |
| 7,992,199 B1 | 8/2011 | Winick et al. | |
| 8,180,654 B2 | 5/2012 | Berkman et al. | |
| 8,321,934 B1 | 11/2012 | Cooley et al. | |
| 2003/0055994 A1* | 3/2003 | Herrmann et al. | 709/229 |
| 2003/0070084 A1 | 4/2003 | Satomaa et al. | |
| 2003/0097431 A1 | 5/2003 | Dill | |
| 2003/0126468 A1* | 7/2003 | Markham | 713/201 |
| 2003/0142683 A1 | 7/2003 | Lam et al. | |
| 2004/0003262 A1 | 1/2004 | England et al. | |
| 2004/0085944 A1 | 5/2004 | Boehm | |
| 2004/0093520 A1 | 5/2004 | Lee et al. | |
| 2004/0123153 A1 | 6/2004 | Wright et al. | |
| 2004/0177274 A1 | 9/2004 | Aroya | |
| 2004/0203296 A1 | 10/2004 | Moreton et al. | |
| 2004/0210775 A1 | 10/2004 | Gbadegesin | |
| 2004/0237079 A1 | 11/2004 | Cox et al. | |
| 2005/0114711 A1 | 5/2005 | Hesselink et al. | |
| 2005/0149757 A1 | 7/2005 | Corbett et al. | |
| 2005/0208967 A1 | 9/2005 | Buniatyan | |
| 2005/0254455 A1 | 11/2005 | Plehn et al. | |
| 2006/0037071 A1 | 2/2006 | Rao et al. | |
| 2006/0064391 A1 | 3/2006 | Petrov et al. | |
| 2006/0161985 A1 | 7/2006 | Zhao | |
| 2006/0224794 A1 | 10/2006 | Stevens | |
| 2006/0242686 A1 | 10/2006 | Toda et al. | |
| 2007/0005987 A1* | 1/2007 | Durham et al. | 713/185 |
| 2007/0022474 A1 | 1/2007 | Rowett et al. | |
| 2007/0083939 A1* | 4/2007 | Fruhauf et al. | 726/34 |
| 2007/0118874 A1 | 5/2007 | Adams et al. | |
| 2007/0118893 A1 | 5/2007 | Crawford | |
| 2007/0130457 A1* | 6/2007 | Kamat et al. | 713/151 |
| 2007/0192500 A1 | 8/2007 | Lum | |
| 2007/0192854 A1* | 8/2007 | Kelley et al. | 726/22 |
| 2007/0261112 A1* | 11/2007 | Todd et al. | 726/11 |
| 2008/0083037 A1 | 4/2008 | Kruse et al. | |
| 2008/0098478 A1* | 4/2008 | Vaidya et al. | 726/24 |
| 2008/0109871 A1 | 5/2008 | Jacobs | |
| 2008/0141349 A1 | 6/2008 | Lyle et al. | |
| 2008/0235755 A1 | 9/2008 | Blaisdell et al. | |
| 2008/0282337 A1 | 11/2008 | Crawford | |
| 2009/0106556 A1 | 4/2009 | Hamid | |
| 2009/0254993 A1* | 10/2009 | Leone | 726/25 |
| 2010/0195833 A1 | 8/2010 | Priestley et al. | |
| 2010/0242109 A1 | 9/2010 | Lee | |
| 2010/0251369 A1 | 9/2010 | Grant | |
| 2010/0333088 A1 | 12/2010 | Rogel et al. | |
| 2011/0023118 A1 | 1/2011 | Wright | |
| 2011/0264931 A1 | 10/2011 | Chang et al. | |
| 2011/0268106 A1 | 11/2011 | Dalton, Jr. et al. | |
| 2012/0054744 A1 | 3/2012 | Singh et al. | |
| 2012/0084831 A1 | 4/2012 | Hu et al. | |

OTHER PUBLICATIONS

PMC-Sierra: "MSP8120 Multi-service Security Processor" Product Brief, 2007, PMC-Sierra, Inc. Mission Towers One 3975 Freedom Circle Santa Clara, CA 95054.*

PMC-Sierra, MSP8120 Multi-service Security Processor, 2007, PMC-Sierra Inc, PMC-2070368, Issue 1, pp. 1-2.*

PCT International Search Report and Written Opinion dated Jul. 15, 2008, for International Application No. PCT/IL2006/001428.

PCT International Search Report and Written Opinion dated Apr. 6, 2009, for International Application No. PCT/US2008/055942.

PCT International Search Report dated Nov. 5, 2008, for International Application No. PCT/IL08/00740.

"Model 1: Wireless Mobile Security Appliance," Secure Computing: CyberGuard, a Secure Computing Brand: 2005: 1 page; CyberGuard Corporation; http://support2.cyberguard.com/products/oem/model1.htm.

"Cyberguard Develops a Custom Mobile Security Appliance;" SecurityProNews; Oct. 7, 2004, 1 page; Entry, Inc.; http://www.securitypronews.com/news/secruitynews/spn-45-20041007CyberGuardDevelo . . . .

"Mobile User VPN and PPTP"; Internet Security Handbook; believe published Jun. 5, 2003; copyright 1998-2001; p. 1 and 2; WatchGuard Technologies, Inc.; http://www.watchguard.com/help/lss/41/handbook/vpn3.htm.

"Zyxel Releases Worlds First Palm-Sized Portable Personal Firewall for Ultimate Security; ZyWall P1 Pushes Network Security to the End-Point PC's with Minimum Administration Effort;" ZyXel News Mar. 8, 2005; 1 page; ZyXel Communications Corp.: Hsinchu, Taiwan; http://globalzyxel.com/news/press.php?indexflag-20050310013432.

Breeden II, John et al., "A Hardware Firewall You Take With You," Government Computer News, located at http:/gcn.com/Articles/2005/06/01/A-hardware-firewall-you-take-with-you.aspx?p=1, Jun. 1, 2005.

Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.

European Patent Application No. 06821641.5, Search Report mailed Oct. 25, 2011.

European Patent Application No. 08847968.8, Search Report mailed Oct. 25, 2011.

International Application No. PCT/US2009/065204, International Search Report and Written Opinion mailed Jan. 13, 2010.

International Application No. PCT/US2013/064161, International Search Report and Written Opinion mailed Apr. 18, 2014.

Claessens, Joris et al., "(How) Can Mobile Agents Do Secure Electronic Transactions on Mobile Hosts? A Survey of the Security Issues and the Current Solutions," ACM Transactions on Intenet Technology, vol. 3, No. 1, pp. 28-48, Feb. 2003.

* cited by examiner

SYSTEM AND METHOD FOR IMPLEMENTING CONTENT AND NETWORK SECURITY INSIDE A CHIP

PRIORITY CLAIM

This application claims benefit of and hereby incorporates by reference provisional patent application Ser. No. 61/039,729, entitled "Methods for Implementing Content and Network security Inside Communication and Memory Chips," filed Mar. 26, 2008. This application hereby incorporates by reference nonprovisional patent application Ser. No. 11/376,919, entitled "System and Method for Providing Network Security to Mobile Devices," filed on Mar. 16, 2006, which claimed benefit to provisional patent application Ser. No. 60/750,326, entitled "Personal Security Appliance," filed on Dec. 13, 2005, by inventor Shlomo Touboul.

TECHNICAL FIELD

This invention relates generally to network security, and more particularly provides a system and method for implementing content and network security inside a chip.

BACKGROUND

The internet is an interconnection of millions of individual computer networks owned by governments, universities, nonprofit groups, companies and individuals. While the internet is a great source of valuable information and entertainment, the internet has also become a major source of system damaging and system fatal application code, such as "viruses," "spyware," "adware," "worms," "Trojan horses," and other malicious code.

To protect users, programmers design computer and computer-network security systems for blocking malicious code from attacking both individual and network computers. On the most part, network security systems have been relatively successful. A computer that connects to the internet from within an enterprise's network typically has two lines of defense. The first line of defense includes a network security system, which may be part of the network gateway, that includes firewalls, anti-virus, anti-spyware and content filtering. The second line of defense includes individual security software on individual machines, which is not typically as secure as the network security system and is thus more vulnerable to attacks. In combination, the first and second lines of defense together provide pretty good security protection. However, when a device connects to the internet without the intervening network security system, the device loses its first line of defense. Thus, mobile devices (e.g., laptops, desktops, PDAs such as RIM's Blackberry, cell phones, any wireless device that connects to the internet, etc.) when traveling outside the enterprise network are more vulnerable to attacks.

FIG. 1 illustrates an example network system 100 of the prior art. Network system 100 includes a desktop 105 and a mobile device 110, each coupled to an enterprise's intranet 115. The intranet 115 is coupled via a network security system 120 (which may be a part of the enterprise's gateway) to the untrusted internet 130. Accordingly, the desktop 105 and mobile device 110 access the internet 130 via the network security system 120. A security administrator 125 typically manages the network security system 120 to assure that it includes the most current security protection and thus that the desktop 105 and mobile device 110 are protected from malicious code. Demarcation 135 divides the trusted enterprise 140 and the untrusted public internet 130. Because the desktop 105 and the mobile device 110 are connected to the internet 130 via the network security system 120, both have two lines of defense (namely, the network security system 120 and the security software resident on the device itself) against malicious code from the internet 130. Of course, although trusted, the intranet 115 can also be a source of malicious code.

FIG. 2 illustrates an example network system 200 of the prior art, when the mobile device 110 has traveled outside the trusted enterprise 140 and reconnected to the untrusted internet 130. This could occur perhaps when the user takes mobile device 110 on travel and connects to the internet 130 at a cybercafé, at a hotel, or via any untrusted wired or wireless connection. Accordingly, as shown, the mobile device 110 is no longer protected by the first line of defense (by the network security system 120) and thus has increased its risk of receiving malicious code. Further, by physically bringing the mobile device 110 back into the trusted enterprise 140 and reconnecting from within, the mobile device 110 risks transferring any malicious code received to the intranet 115.

As the number of mobile devices and the number of attacks grow, mobile security is becoming increasingly important. The problem was emphasized in the recent Info-Security Conference in New York on Dec. 7-8, 2005. However, no complete solutions were presented.

There is a need for personal security appliances capable of providing levels of network security as provided by enterprise network security systems.

SUMMARY

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

In an embodiment, a mobile security system includes a connection mechanism for connecting to a data port of a mobile device and for communicating with the mobile device; a network connection module for acting as a gateway to a network; a security policy for determining whether to forward content intended for the mobile device to the mobile device; and a security engine for executing the security policy.

The connection mechanism may include at least one of a USB connector, a PCMCIA connector, an Ethernet connector, an internal computer bus, a computer local bus, memory bus, network bus, hard disks bus, serial bus, parallel bus and/or a BlueTooth communication module. The network connection module may include a network interface card that implements WiFi, WiMAX, GPRS, GSM, UMTS, CDMA, Generation 3, other cell phone internet connection protocols, etc. The security engine may include at least one of an antivirus engine, an antispyware engine, a firewall engine, an IPS/IDS engine, a content filtering engine, a multilayered security monitor, a bytecode monitor, and a URL monitor. The security policy may performs weighted risk analysis based on content type, content source, content category, or historical actions of the user. The remote management module may be capable of receiving security policy updates, security engine updates, and security data updates (including malicious content signatures). The mobile security system may include a distribution module capable of forwarding updates to other mobile security systems, and/or a backup module capable of storing at least a portion of the boot sector of the mobile device should the boot sector of the mobile device become compromised. The mobile security system may include a remote configuration module capable of communicating with a wizard, the wizard being in communication with an enterprise network security system, the wizard capable of substantially automatic generation of policies and data based on the policies and data on the enterprise network security system, the remote configuration module capable of installing the policies and data generated by the wizard. The mobile security system may include a preboot memory that is not accessible during runtime, the preboot memory storing a copy of at least a portion of the operating system of the mobile security system, the mobile security system being configured to load the operating system portion every time the mobile security system is rebooted.

In another embodiment, a method comprises receiving a network connection request from a mobile device outside of a trusted network; acting as a gateway to a network on behalf of the mobile device; receiving information intended for the mobile device from the network; and determining whether to forward the information to the mobile device in accordance with a security policy.

In another embodiment, a mobile security system comprises means for acting as a gateway to a network on behalf of a mobile device outside of a trusted network; receiving information intended for the mobile device from the network; and determining whether to forward the information to the mobile device in accordance with a security policy.

In yet another embodiment, a method comprises receiving internet traffic on a mobile device via a wireless connection; redirecting the internet traffic at the kernel level to a mobile security system; scanning the internet traffic for violations of a security policy; cleaning the internet traffic of any violations of the security policy to generate cleaned internet traffic; and sending the cleaned internet traffic to the mobile device for execution.

In still another embodiment, a system comprises a wireless network interface card on a mobile device for receiving internet traffic; a kernel-level redirector on the mobile device for redirecting the internet traffic at the kernel level to a mobile security system; a security engine for scanning the internet traffic for violations of a security policy and for cleaning the internet traffic of any violations of the security policy to generate cleaned internet traffic; and a connection mechanism for receiving the redirected internet traffic from the kernel-level redirector and for sending the cleaned internet traffic to the mobile device for execution.

Systems and methods for implementing content and network security inside a chip are disclosed. In exemplary embodiments, a system comprises a communication chip and a second processor. The communication chip comprises a router and security instructions. The router is configured to intercept untrusted data between a network and a first router. The second processor is configured to receive the untrusted data from the router, process the untrusted data with the security instructions to produce trusted data, and provide the trusted data to the router.

The security instructions may comprise an operating system. The security instructions may also be stored in a protected memory. The security instructions may be loaded into RAM of a digital device.

The communication chip may be within a network interface card. The second processor may be within the communication chip. The first processor may comprise the second processor In other embodiments, the system comprises a flash memory device and a second processor. The flash memory device may comprise flash memory media, a router, and security instructions. The router may be configured to intercept untrusted data between a first processor and the flash memory media. The second processor may be configured to receive the untrusted data from the router, to process the untrusted data with the security instructions to produce trusted data, and to provide the trusted data to the router.

In some embodiments, a method comprises storing security instructions, loading the security instructions into a memory, executing the security instructions with a second processor, intercepting untrusted data between a network and a first processor with a router in a communication chip, routing the untrusted data from the router to the second processor, processing the untrusted data with the second processor executing the security instructions to produce trusted data, and providing the trusted data from the second processor to the router.

Alternatively, a method may comprise, in some embodiments, storing security instructions, loading the security instructions into a memory, executing the security instructions with a second processor, intercepting untrusted data between a first processor and flash memory media, routing the untrusted data from the router to the second processor, processing the untrusted data with the second processor executing the security instructions to produce trusted data, and providing the trusted data from the second processor to the router.

An exemplary computer readable medium is configured to store instructions in a communication chip, the instructions executable by a processor to perform a method. The method comprises, before reaching a destination, intercepting untrusted data between a network and a first processor within in a communication chip, routing the untrusted data to the second processor, processing the untrusted data with the second processor executing the security instructions to produce trusted data, and providing the trusted data from the second processor to the data's destination.

An exemplary computer readable medium is configured to store instructions in a flash memory device, the instructions executable by a processor to perform a method. The method comprises, before reaching a destination, intercepting untrusted data between a first processor and flash memory media within the flash memory device, routing the untrusted data to the second processor, processing the untrusted data with the second processor executing the security instructions to produce trusted data, and providing the trusted data from the second processor to the data's destination.

DETAILED DESCRIPTION

The following description is provided to enable any person skilled in the art to make and use the invention, and is provided in the context of a particular application and its requirements. Various modifications to the embodiments may be possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

Figure 1:
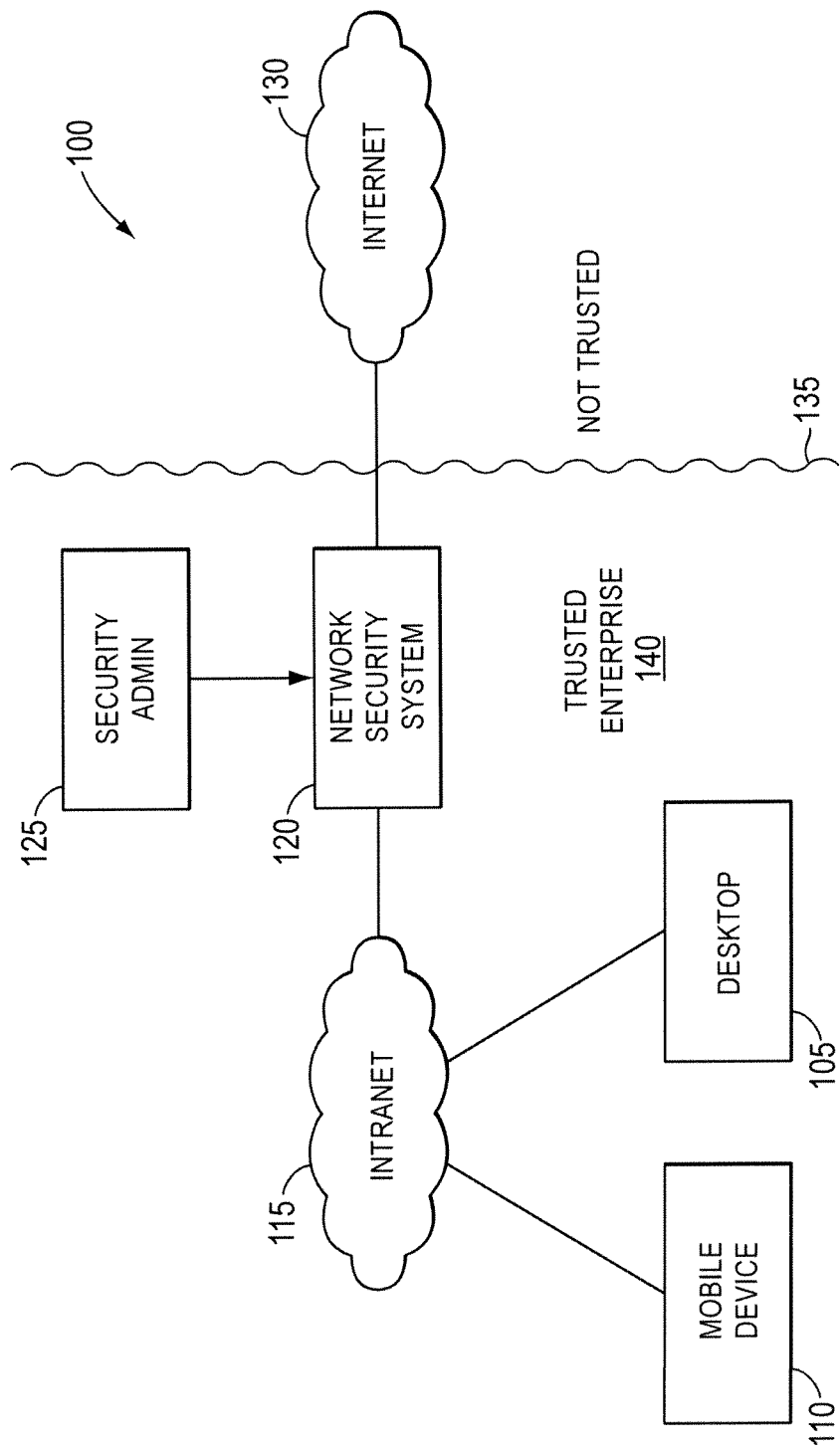
FIG. 1 is a block diagram of a prior art network system in a first state.
Figure 2:
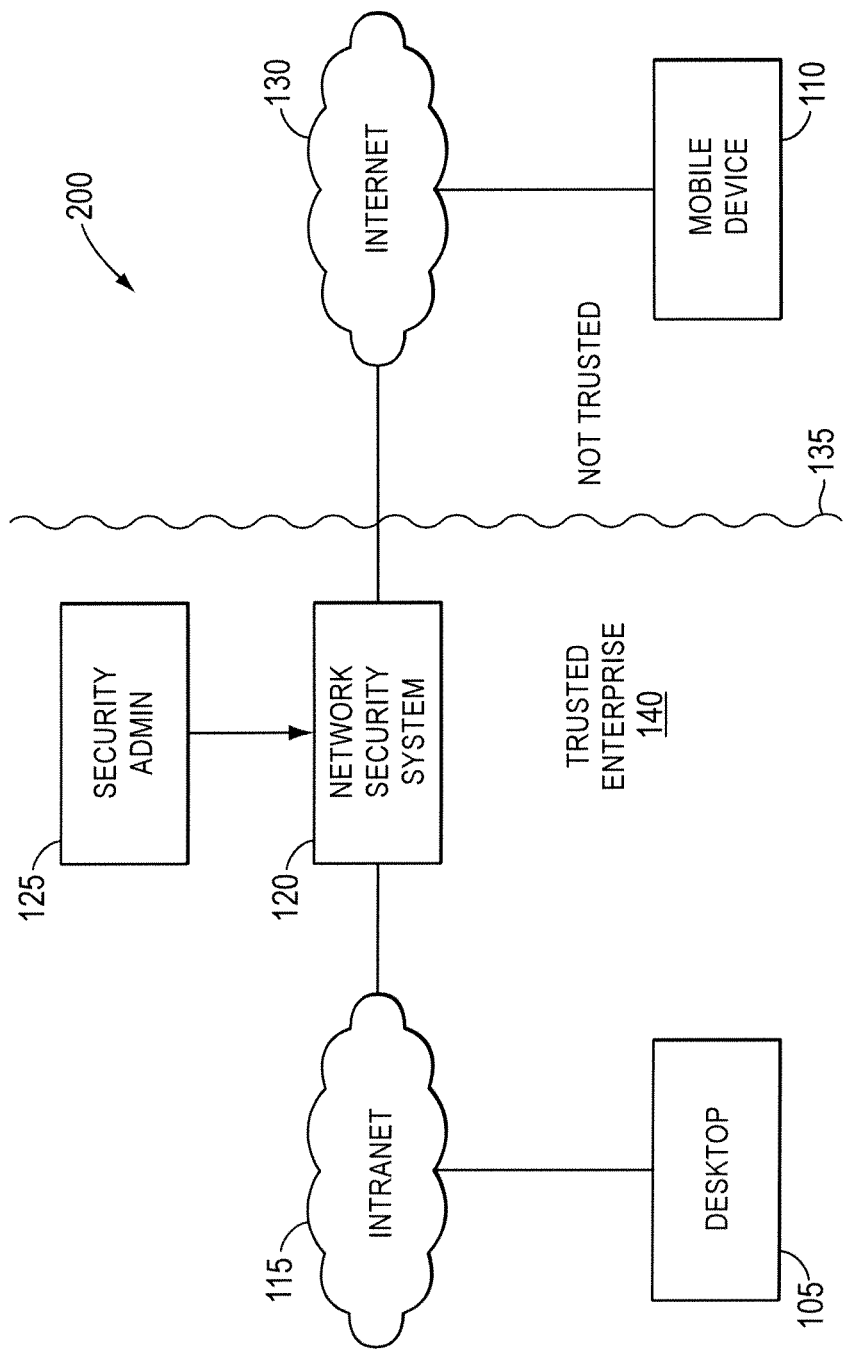
FIG. 2 is a block diagram of a prior art network system in a second state.
Figure 3:
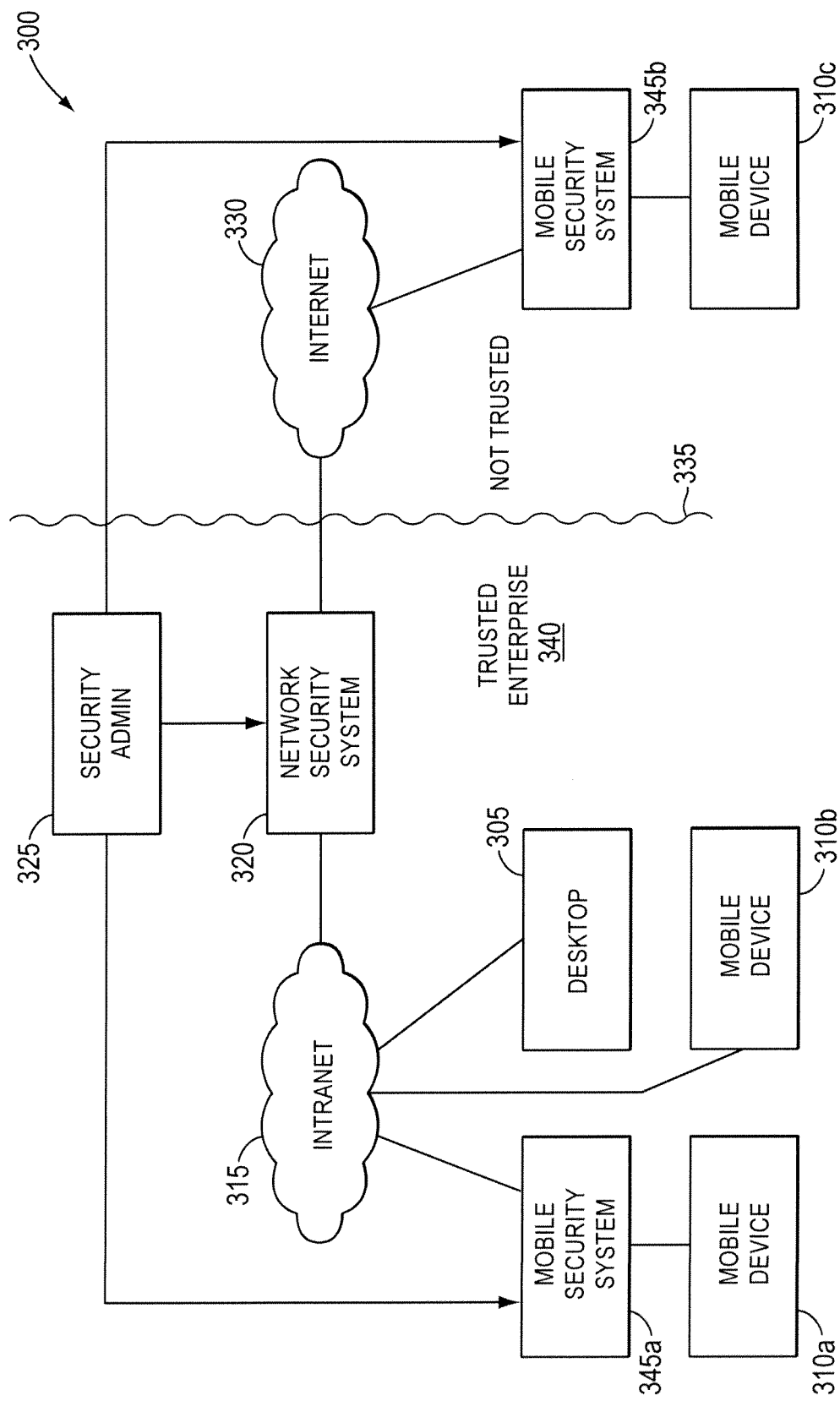
FIG. 3 is a block diagram of a network system in accordance with an embodiment of the present invention.

FIG. 3 illustrates a network system 300 in accordance with an embodiment of the present invention. Network system 300 includes a desktop 305, a first mobile device 310a, and a second mobile device 310b. The first mobile device 310a is illustrated as within the enterprise network 340 at this time and is coupled via a mobile security system 345a to the enterprise's intranet 315. The desktop 305 and second mobile device 310b are also within the enterprise network 340 but in this embodiment are coupled to the intranet 315 without an intervening mobile security system 345 such as mobile security system 345b. The intranet 315 is coupled via a network security system 320 (which may be part of the enterprise's gateway) to the untrusted internet 330. Accordingly, the first mobile device 310a, the second mobile device 310b and the desktop 305 access the untrusted internet 330 via the network security system 320. Each may also be protected by a personal security system resident thereon (not shown). A third mobile device 310c is currently outside the enterprise network 340 and is coupled via a mobile security system 345b to the untrusted internet 330. The third mobile device 310 may be in use by an employee of the trusted enterprise 340 who is currently on travel. A security administrator 325 manages the mobile security system 345a, the mobile security system 345b, and the network security system 320 to assure that they include the most current security protection. One skilled in the art will recognize that the same security administrator need not manage the various devices. Further, the security administrator could be the user and need not be within the trusted enterprise 340.

Demarcation 335 divides the trusted enterprise 340 and the untrusted publicly accessible internet 330. Each of mobile device 310a, 310b and 310c may be referred to generically as mobile device 310, although they need not be identical. Each mobile security system 345a and 345b may be referred to generically as mobile security system 345, although they need not be identical.

As shown, although the mobile device 310c has traveled outside the trusted enterprise 340, the mobile device 310c connects to the untrusted internet 330 via the mobile security system 345b and thus retains two lines of defense (namely, the mobile security system 345b and the security software resident on the device itself). In this embodiment, the mobile security system 345 effectively acts as a mobile internet gateway on behalf of the mobile device 310c. In an embodiment, the mobile security system 345 may be a device dedicated to network security. In an embodiment, each mobile security system 345 may support multiple mobile devices 310, and possibly only registered mobile devices 310, e.g., those belonging to enterprise 340.

Each mobile security system 345 (e.g., 345a, 345b) may be a miniature server, based on commercial hardware (with Intel's Xscale or any other CPU as the core), Linux OS and network services, and open-source firewall, IDS/IPS and anti-virus protection. The mobile security system 345 may be based on a hardened embedded Linux 2.6.

In this embodiment, because the security administrator 325 is capable of remotely communicating with the mobile security system 345b, IT can monitor and/or update the security policies/data/engines implemented on the mobile security system 345b. The security administrator 325 can centrally manage all enterprise devices, remotely or directly. Further, the security administrator 325 and mobile security systems 345 can interact to automatically translate enterprise security policies into mobile security policies and configure mobile security systems 345 accordingly. Because the mobile security system 345 may be generated from the relevant security policies of the enterprise 340, the mobile device 310c currently traveling may have the same level of protection as the devices 305/310 within the trusted enterprise 340.

Figure 8:
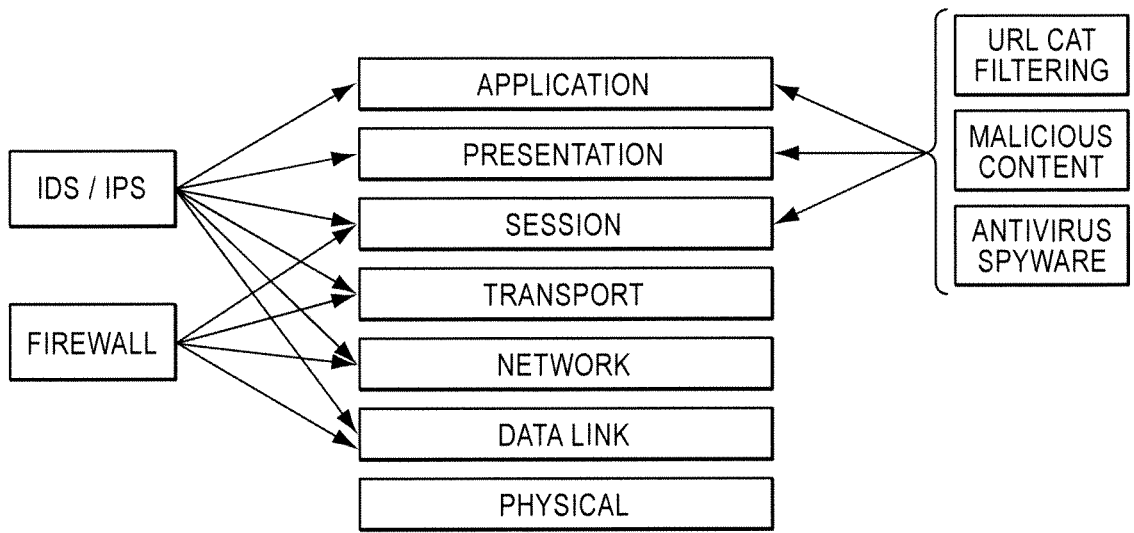
FIG. 8 is a block diagram illustrating details of network security measures relative to the OSI layers.

The mobile security system 345 may be designed as an add-on to existing software security or to replace all security hardware and software on a traveling mobile device. These security applications will preferably operate on different OSI layers to provide maximum security and malicious code detection, as shown in the example system illustrated in FIG. 8. Operating on the lower OSI layers and doing TCP/IP packets analysis only (by screening firewall or router packets) would miss virus and/or worm behavior. Also, many modern viruses use mobile code implemented on a "higher" level than the $7^{th}$ OSI layer (Application—HTTP, FTP, etc.) and therefore cannot be interpreted at the packet layer nor at the application layer. For example, applying antivirus analysis only at the session or transport layer on a malicious Java Script (that is included in an HTML page), trying to match the signature with packets and without understanding the content type (Java Script), will not detect the malicious nature of the Java Script. To offer greater protection, the mobile security system 345 may act as corporate class security appliance and engage different security applications based on the content type and the appropriate OSI layers, (or even a "higher" level if content is encapsulated in the application layer). The mobile security system 345 may be configured to perform content analysis at different OSI layers, e.g., from the packet level to the application level. It will be appreciated that performing deep inspection at the application level is critical to detect malicious content behavior and improve detection of viruses, worms, spyware, Trojan horses, etc. The following software packages may be implemented on the mobile security system 345:

Firewall and VPN—including stateful and stateless firewalls, NAT, packet filtering and manipulation, DOS/DDOS, netfilter, isolate user mobile devices from the internet and run VPN program on the device, etc.

Optional web accelerator and bandwidth/cache management based on Squid.

IDS/IPS—Intrusion detection and prevention system based on Snort. Snort is an open source network intrusion prevention and detection system utilizing a rule-driven language, which combines the benefits of signature, protocol- and anomaly-based inspections.

Antivirus and antispyware based on ClamAV; additional AV and AS engines, e.g., McAfee, Kaspersky, Pandamay, may be offered for additional subscription fees.

Malicious Content Detection—on the fly heuristics that perform content analysis to detect malicious content before having signatures. This will be based on a rule base and updated rules and will be content dependent scanning.

URL Categorization Filtering—based on a commercial engine, such as Surfcontrol, Smart Filters or Websense. May provide around 70 categories of URLs such as gambling, adult content, news, webmail, etc. The mobile device 345 may apply different security policies based on the URL category, e.g., higher restriction and heuristics for Gambling or Adult content web sites, etc.

Figure 4:
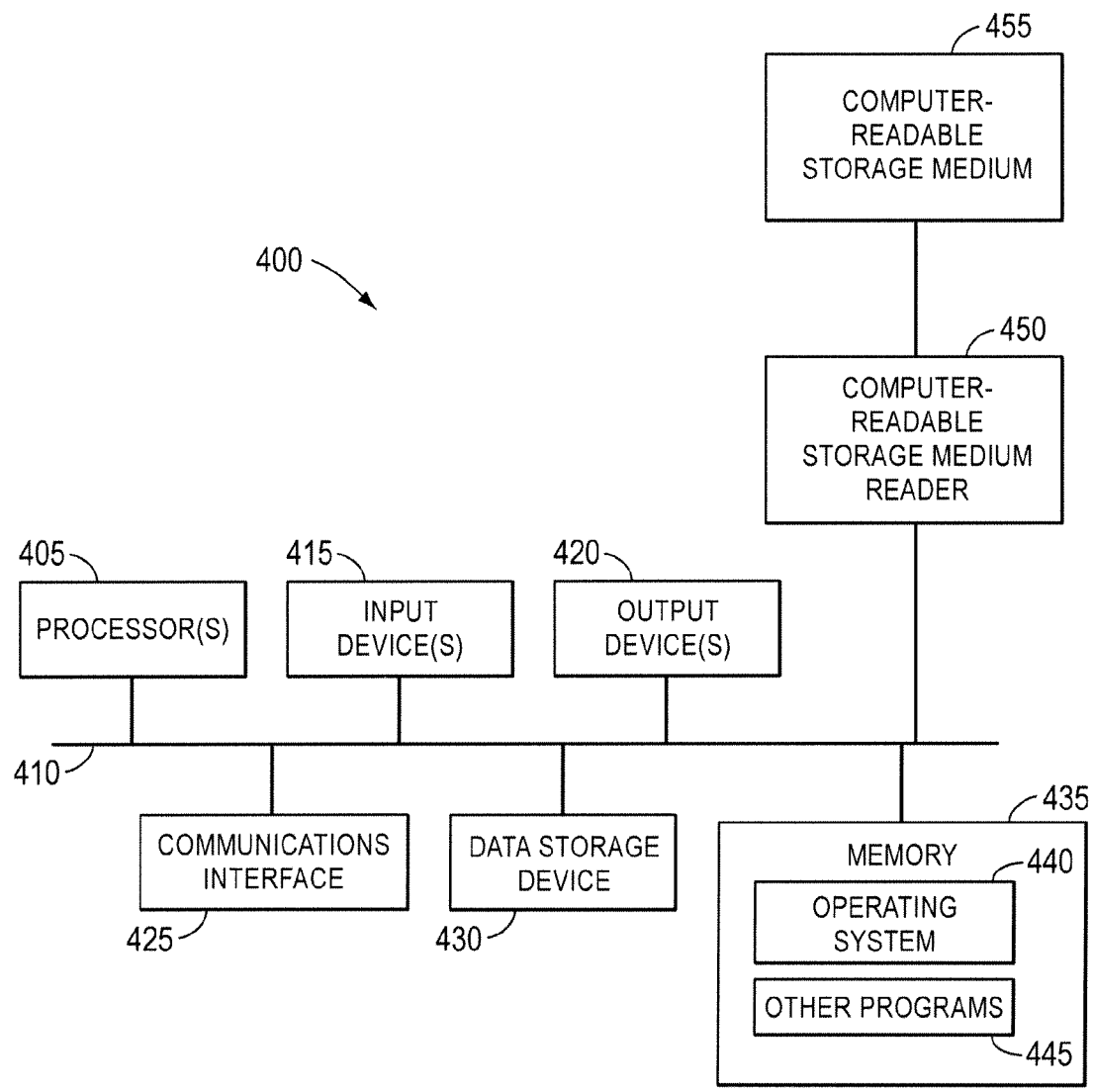
FIG. 4 is a block diagram illustrating details of a computer system in accordance with an embodiment of the present invention.

FIG. 4 is a block diagram illustrating details of an example computer system 400, of which each desktop 305, mobile device 310, network security system 320, mobile security system 345, and security administrator 325 may be an instance. Computer system 400 includes a processor 405, such as an Intel Pentium® microprocessor or a Motorola Power PC® microprocessor, coupled to a communications channel 410. The computer system 400 further includes an input device 415 such as a keyboard or mouse, an output device 420 such as an LCD or cathode ray tube display, a communications device 425, a data storage device 430 such as a magnetic disk, Solid State Disk, or flash memory, and memory 435 such as Random-Access Memory (RAM), each coupled to the communications channel 410. The communications interface 425 may be coupled directly or via a mobile security system 345 to a network such as the internet. One skilled in the art will recognize that, although the data storage device 430 and memory 435 are illustrated as different units, the data storage device 430 and memory 435 can be parts of the same unit, distributed units, virtual memory, etc.

The data storage device 430 and/or memory 435 may store an operating system 440 such as the Microsoft Windows XP, the IBM OS/2 operating system, the MAC OS, UNIX OS, LINUX OS and/or other programs 445. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 400 may also include additional information, such as network connections, additional memory, additional processors, LANs, input/output lines for transferring information across a hardware channel, the internet or an intranet, etc. One skilled in the art will also recognize that the programs and data may be received by and stored in the system in alternative ways. For example, a computer-readable storage medium (CRSM) reader 450 such as a magnetic disk drive, hard disk drive, magneto-optical reader, CPU, etc. may be coupled to the communications bus 410 for reading a computer-readable storage medium (CRSM) 455 such as a magnetic disk, a hard disk, a magneto-optical disk, RAM, etc. Accordingly, the computer system 400 may receive programs and/or data via the CRSM reader 450. Further, it will be appreciated that the term "memory" herein is intended to cover all data storage media whether permanent or temporary.

Figure 5:
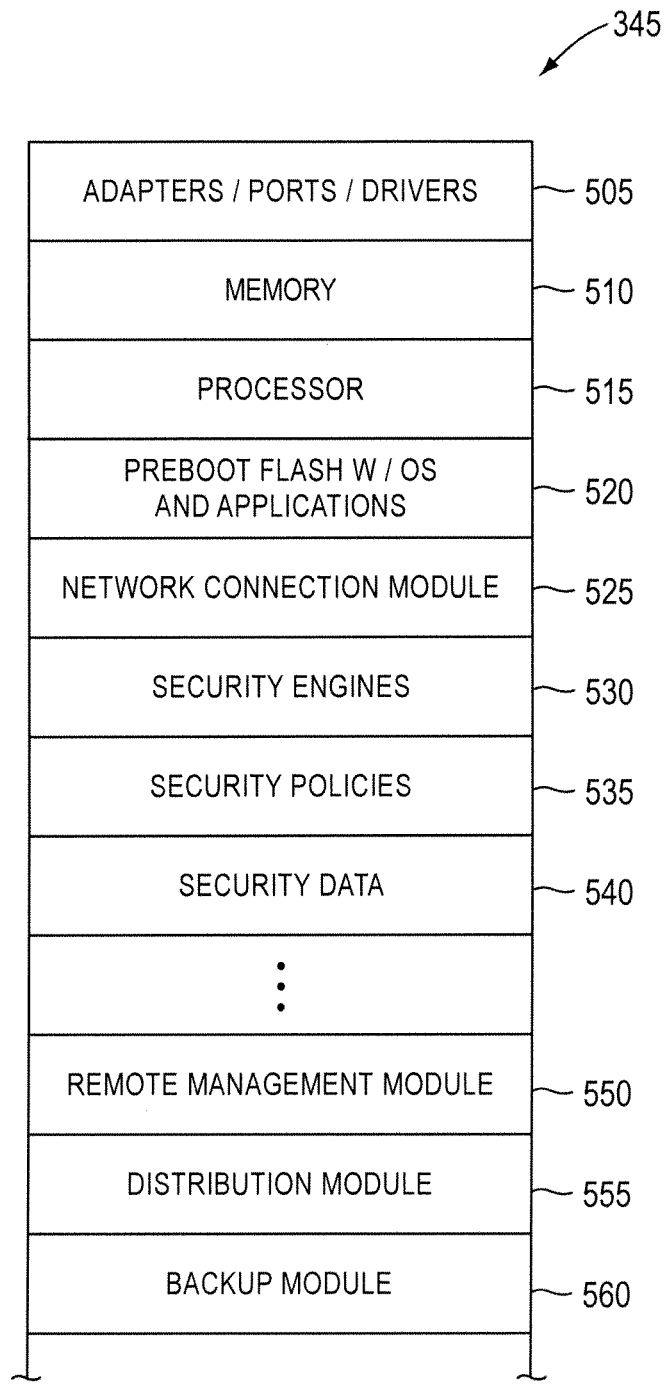
FIG. 5 is a block diagram illustrating details of the mobile security system in accordance with an embodiment of the present invention.

FIG. 5 is a block diagram illustrating details of the mobile security system 345 in accordance with an embodiment of the present invention. Mobile security system 345 includes adapters/ports/drivers 505, memory 510, a processor 515, a preboot flash/ROM memory module 520 storing a secure version of the mobile security system's operating system and other applications, network connection module 525, security engines 530, security policies 535, security data 540, remote management module 550, distribution module 555, and backup module 560. Although these modules are illustrated as within the mobile security system 345, one skilled in the art will recognize that many of them could be located elsewhere, e.g., on the security administrator 325 or on third-party systems in communication with the mobile security system 345. The mobile security system 345 may be in a pocket-size, handheld-size or key-chain size housing, or possibly smaller. Further, the mobile security system 345 may be incorporated within the mobile device 310.

The adapters/ports/drivers 505 include connection mechanisms (including software, e.g., drivers) for USB, Ethernet, WiFi, WiMAX, GSM, CDMA, BlueTooth, PCMCIA, an Internal computer bus, a computer local bus, memory bus, network bus, hard disks bus, serial or parallel bus, and/or other connection data ports on the mobile security system 345. In one embodiment, the adapters/ports/drivers 505 may be capable of connection to multiple devices 310 to provide network security to the multiple devices 310.

Memory 510 and processor 515 execute the operating system and applications on the mobile security system 345. In this example, the preboot flash 520 stores the operating system and applications. At boot time, the operating system and applications are loaded from the preboot flash 520 into memory 510 for execution. Since the operating system and applications are stored in the preboot flash 520, which cannot be accessed during runtime by the user, the operating system and applications in the preboot flash 520 are not corruptible. Should the copy of the operating system and applications in memory 510 be corrupted, e.g., by malicious code, the operating system and applications may be reloaded into the memory 510 from the preboot flash 520, e.g., upon restart. Although described as stored within the preboot flash 520, the OS and applications can be securely stored within other read-only memory devices, such as ROM, PROM, EEPROM, etc.

Memory (including memory 510 and preboot flash 520) on the mobile security system 345 may be divided into zones as follows:

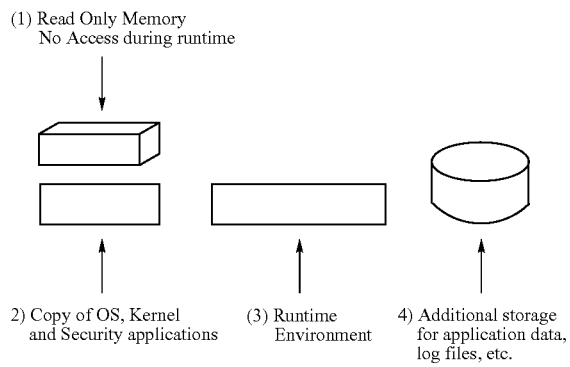

(1) Read Only Memory
   No Access during runtime

2) Copy of OS, Kernel and Security applications
(3) Runtime Environment
4) Additional storage for application data, log files, etc.

Upon each "hard" restart, the boot loader (resident at area 1) of the mobile security system 345 copies the kernel and security applications (a fresh unchanged copy) from area 1 to 2. This causes a clean version of the OS and applications to be loaded into area 2 each time. That way, if a special mobile security system 345 attack is developed, the attack will be unable to infect the system, since the OS and applications are precluded from accessing memory area 1 during runtime. Further, any attack that does reach memory 510 will be able to run only once and will disappear upon a hard restart. A triggering mechanism may be available to restart the mobile security system 345 automatically upon infection detection.

The network connection module 525 enables network connection, e.g., to the internet 330 or the intranet 315 via network communication hardware/software including WiFi, WiMAX, CDMA, GSM, GPRS, Ethernet, modem, etc. For example, if the mobile device 310 wishes to connect to the internet 330 via a WiFi connection, the adapters/ports/drivers 505 may be connected to the PCI port, USB port or PCMCIA port of the mobile device 310, and the network connection module 525 of the mobile security system 345 may include a WiFi network interface card for connecting to wireless access points. Using the network connection module 425, the mobile security system 345 may communicate with the network as a secure gateway for the mobile device 310. Other connection architectures are described in FIGS. 10A-10C.

The security engines 530 execute security programs based on the security policies 535 and on security data 540, both of which may be developed by IT managers. Security engines 530 may include firewalls, VPN, IPS/IDS, anti-virus, anti-spyware, malicious content filtering, multilayered security monitors, Java and bytecode monitors, etc. Each security engine 530 may have dedicated security policies 535 and security data 540 to indicate which procedures, content, URLs, system calls, etc. the engines 530 may or may not allow. The security engines 530, security policies 535 and security data 540 may be the same as, a subset of, and/or developed from the engines, policies and data on the network security system 320.

To provide a higher security level provided by antivirus and antispyware software, the security engines 530 on each mobile security system 345 may implement content analysis and risk assessment algorithms. Operating for example at OSI Layer 7 and above (mobile code encapsulated within Layer 7), these algorithms may be executed by dedicated High Risk Content Filtering (HRCF) that can be controlled by a rules engine and rule updates. The HRCF will be based on a powerful detection library that can perform deep content analysis to verify real content types. This is because many attacks are hidden within wrong mime types and/or may use sophisticated tricks to present a text file type to a dangerous active script or ActiveX content type. The HRCF may integrate with a URL categorization security engine 530 for automatic rule adjustment based on the URL category. In one embodiment, when the risk level increases (using the described mechanism) the mobile security system 345 may automatically adjust and increase filtering to remove more active content from the traffic. For example, if greater risk is determined, every piece of mobile code, e.g., Java script, VB script, etc. may be stripped out.

Three aspects for integration with corporate policy server legacy systems include rules, LDAP and active directory, and logging and reporting as discussed below. In one embodiment, a policy import agent running on the security administrator 325 will access the rule base of Checkpoint Firewall-1 and Cisco PIX Firewalls and import them into a local copy. A rule analysis module will process the important rules and will offer out-of-the-box rules and policies for mobile security systems 345. This proposed policy will offer all mobile security systems 345 a best fit of rules that conform the firewall policy of the enterprise 340. The agent will run periodically to reflect any changes and generate updates for mobile security system 345 policies 535. The LDAP and Active Directory may be integrated with the directory service to maintain mobile security system 345 security policies 535 that respond to the enterprise's directory definitions. For example, a corporate policy for LDAP user Group "G" may automatically propagate to all mobile security systems 345 in "G" group. Mobile security system 345 local logs and audit trails may be sent in accordance to a logging and reporting policy to a central log stored at the security administrator 325. Using a web interface, IT may be able to generate reports and audit views related to all mobile device 310 users, their internet experiences, and attempts to bring infected devices back to the enterprise 340. IT will be able to forward events and log records into legacy management systems via SYSLOG and SNMP Traps.

The security engines 530 may perform weighted risk analysis. For example, the security engine 530 may analyze content transferred via protocols such as HTTP, FTP, SMTP, POP3, IM, P2P, network layer 1 to layer 6 (based on OSI model), SCSI, iSCSI, IDE, ATA, SATA and other hard disk protocols, etc. including any traffic arriving from the internet 330. The security engine 530 may assign a weight and rank for every object based on its type, complexity, richness in abilities, source of the object, etc. The security engine 530 may assign weight based on the source using a list of known dangerous or known safe sources. The security engine 530 may assign weight to objects based on the category of the source, e.g., a gambling source, an adult content source, a news source, a reputable company source, a banking source, etc. The security engine 530 may calculate the weight, and based on the result determine whether to allow or disallow access to the content, the script to run, the system modification to occur, etc. The security engine 530 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

In some embodiments, the security engines 530, security policies 535 and security data 540 may enable bypassing the mobile security system 345. The security policy 535, set by the security administrator 325, may include a special attribute to force network connection through the mobile security system 325 when outside the trusted enterprise 340. Thus, if this attribute is set "on," when a mobile device 310 attempts to connect to the internet 330 without the mobile security system 345 and not from within the trusted enterprise 340, all data transfer connections including LAN connection, USB-net, modem, Bluetooth, WiFi, etc. may be closed. The mobile device 310 may be totally isolated and unable to connect to any network, including the internet 330.

Figure 6:
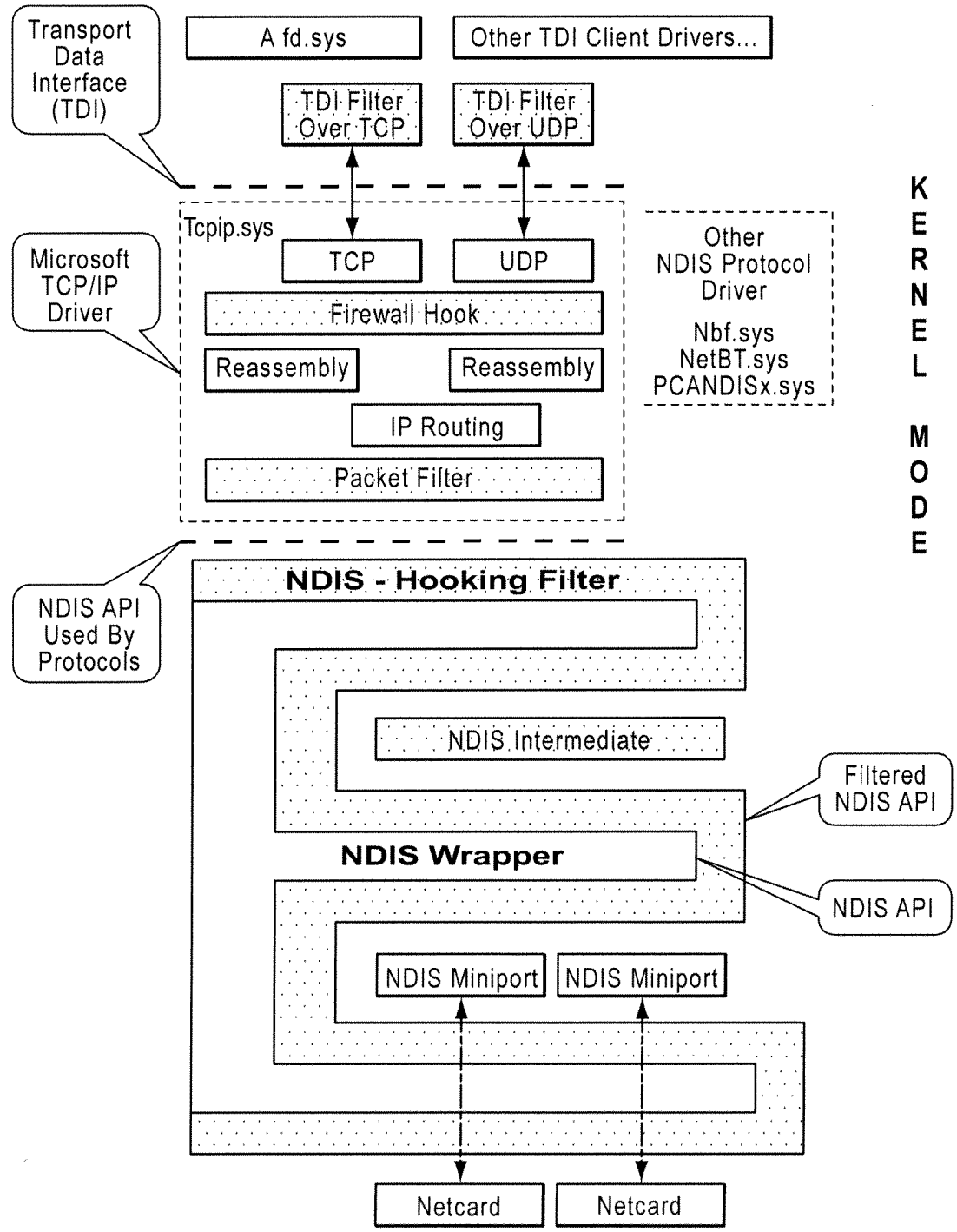
FIG. 6 is a block diagram illustrating details of the mobile security system in accordance with a Microsoft Window's embodiment.

In one embodiment, to enable this, when first connecting the mobile security system 345 to the mobile device 310 using for example the USB cable (for both power and USB connection creation), the USB plug & play device driver will be sent into the mobile device 310. The installed driver may be "Linux.inf" which allows a USB-net connection for the mobile security system 345. This connection allows the mobile security system 345 to access the internet 330 via the USB port and using the mobile device 310 network connection plus additional code ("the connection client"). In a Windows example, the connection client may be installed at the NDIS level of the mobile device 310 above all the network interface cards of every network connection as shown in FIG. 6. The implementation will be as an NDIS Intermediate (IM) Driver or NDIS-Hooking Filter Driver. Both implementations may be at the kernel level, so that an end user cannot stop or remove it. When starting the mobile device 310, the connection client may attempt to connect to the security administrator 325 or the network security system 320 locally within the trusted enterprise 340. If the node is not found (finding via VPN is considered as not found in local LAN), the connection client will assume it is working from outside the trusted enterprise 340 and expects to find the mobile security system 345 connected, e.g., via USB-net or other connection mechanism. If the mobile security system 345 is not found, the connection client may avoid any communication to any network connection. By a policy definition, this behavior can be modified to allow communication to the enterprise 340 via VPN installed in the mobile device 310. Similarly, in case of a mobile device system 345 failure, all traffic may be disabled, except for the VPN connection into the enterprise 340.

It will be appreciated that NDIS is one possible implementation of intercepting traffic at the kernel level. For example, in another embodiment, the system may hook Winsock or apply other ways that may be in future Windows versions.

In an embodiment where the mobile security system 345 supports multiple mobile devices 310, the security engines 530, security policies 535 and security data 540 may be different for each mobile device 310 (e.g., based on for example user preferences or IT decision). Alternatively, it can apply the same engines 530, policies 535 and data 540 for all connected devices 310.

The remote management module 550 enables communication with security administrator 325 (and/or other security administrators), and enables local updating of security engines 530, security policies 535, security data 540 including signatures and other applications. In one embodiment, modification to the security policies 535 and data 540 can be done by the security administrator 325 only. The remote management module 550 of the mobile security system 345 may receive updates from an update authorities device (UAD), e.g., on the security administrator 325 via a secured connection. A UAD may operate on an update server at a customer IT center located on the internet 330 to forward updates to mobile security systems 345 that possibly do not belong to an enterprise 540 in charge of managing updates. A UAD may operate on a mobile security system 345. Security engine 530 updates may modify the antivirus engine DLL, etc. OS and security application updates may be implemented only from within the enterprise 540 while connecting to the security administrator 325 and via an encrypted and authenticated connection.

The security administrator 325 can modify URL black and white lists for remote support to traveling users. In case of false positives, the security administrator 325 may allow access to certain URLs, by bypassing the proactive heuristics security but still monitoring by firewall, antivirus, IPS/IDS, etc. Additional remote device-management features may enable the security administrator 325 to perform remote diagnostics, access local logs, change configuration parameters, etc. on the mobile security system 345. The security administrator 325 may delegate tasks to a helpdesk for support.

Figure 7:
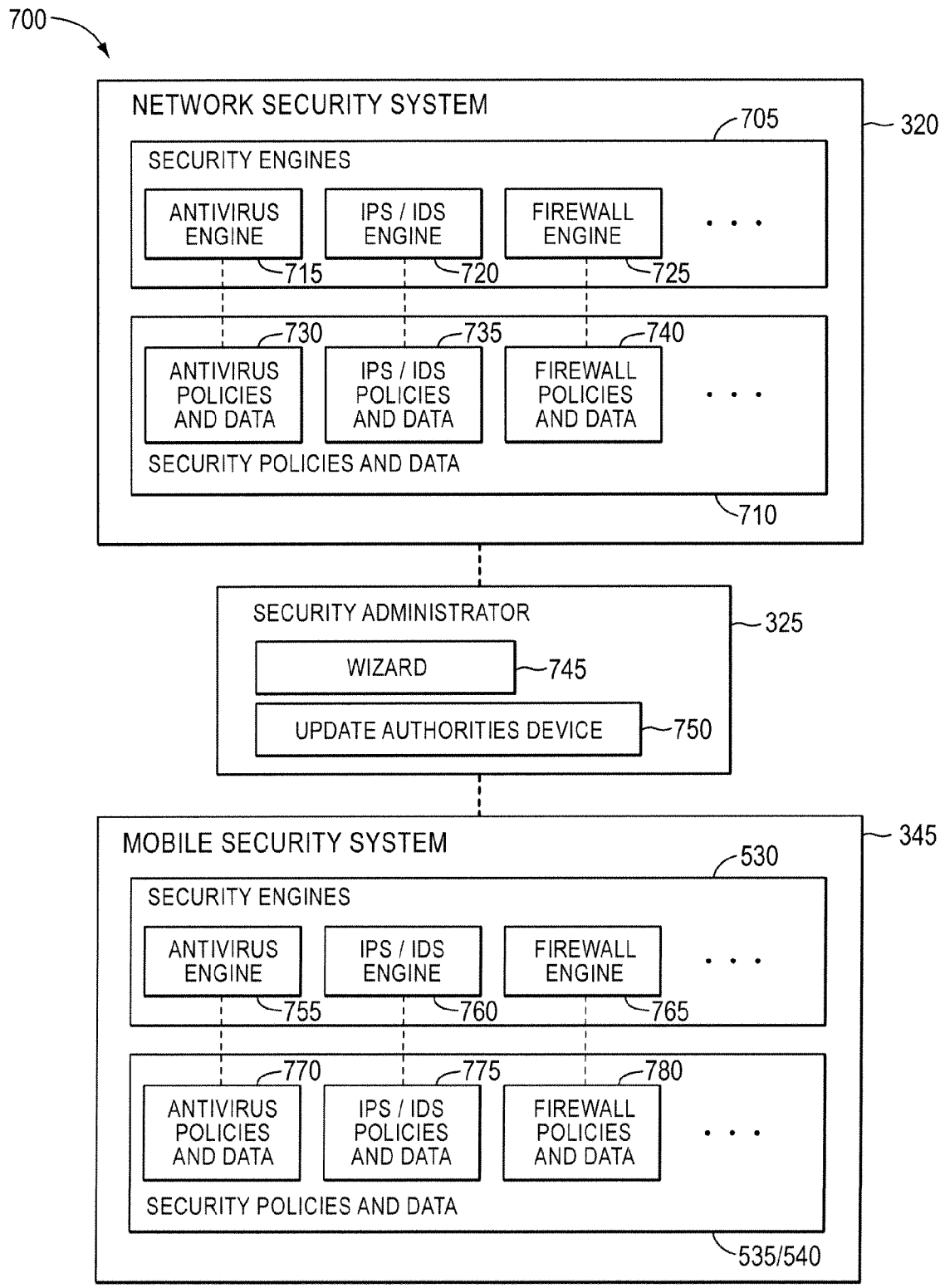
FIG. 7 is a block diagram illustrating details of a smart policy updating system in accordance with an embodiment of the present invention.

The remote management module 550 may communicate with a wizard (e.g., wizard 745), which may be on the security administrator 325, as illustrated in FIG. 7, or on another system. Details of the wizard 745 and details of the communication schemes between the remote management module 550 and the wizard 745 are described below with reference to FIG. 7.

The distribution module 555 enables distribution of updates, e.g., security policy 535 updates including rule updates, security data 540 updates including signature updates, security engine 530 updates, application/OS updates, etc. by the mobile security system 345 to N other mobile security systems 345. A routing table identifying the N other mobile security systems 345 to whom to forward the updates may be provided to the distribution module 555 to enable system 345 to system 345 communication. Updates may be implemented according to policies set by the security administrator 325. When forwarding updates, the distribution module 555 acts as a UAD.

Each mobile security system 345 may obtain its routing table with security information updates, periodically, at predetermined times, upon login, etc. The routing tables may be maintained on a server, e.g., the security administrator 325 or another mobile security system 345. In one embodiment, the mobile security systems 345 may contact the server to retrieve the routing tables. Alternatively, the server may push the routing tables to the mobile security systems 345.

Figure 9:
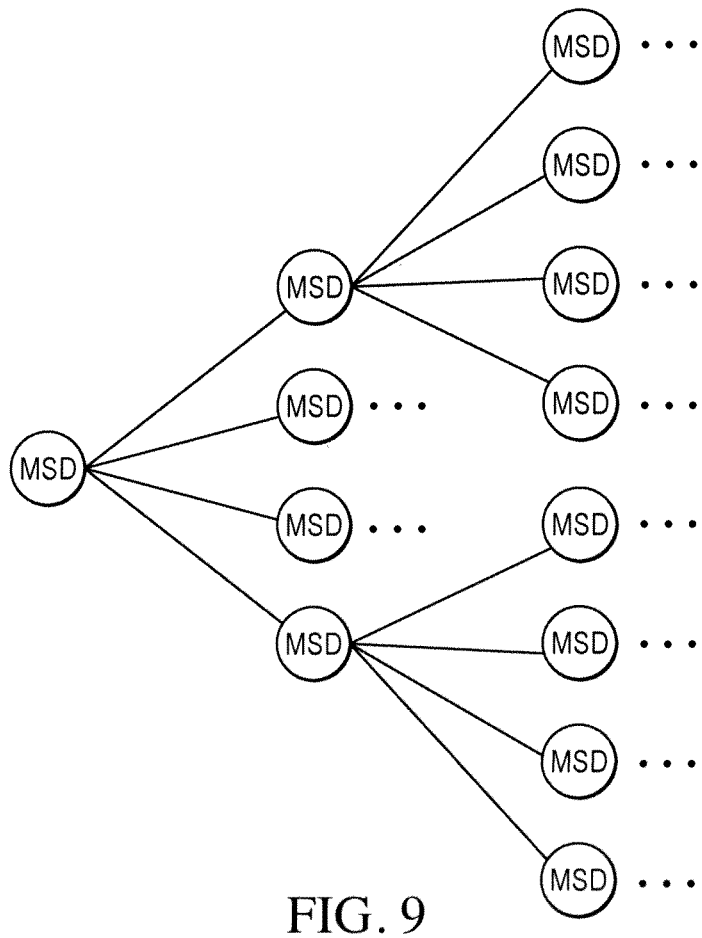
FIG. 9 is a block diagram illustrating details of the communication technique for spreading security code to the mobile security systems.

The distribution module 555 may enable rapid updates as shown in FIG. 9. Currently, all commercial antivirus products available do not update devices faster than viruses spread. To assure that a new virus attack does not spread faster than for example signature updates, each mobile security system 345 may be an active UAD. In one embodiment, as shown in FIG. 9, each mobile security system 345 is responsible for forwarding the signature updates to four other devices 345. As one skilled in the art will recognize all devices 345 need to forward to the same number of other devices 345. Multiple devices 345 may be responsible for forwarding to the same device 345. When necessary, offline devices 345 being activated may poll the server, e.g., the security administrator 325, for routing table updates. Many other updating techniques are also possible.

The backup module 560 may constantly backup image and changes of the boot sector and system files of the mobile device 310 into the flash memory 520 or into another persistent memory device. That way, in case of major failure, including a loss of the system or boot sector of the mobile device 310, the mobile security system 345 may be identified as a CD-ROM during reboot and may launch the backup module (or separate program) to restore the boot sector and system files on the mobile device 310, thereby recovering the mobile device 310 without the need for IT support. In an embodiment where the network security system 345 supports multiple mobile devices 310, the backup module 560 may contain separate boot sector and system files for each of the mobile devices 310, if different.

FIG. 7 is a block diagram illustrating details of a smart policy updating system 700 in accordance with an embodiment of the present invention. System 700 includes the security administrator 325 coupled to the network security system 320 and to the mobile security system 345. The network security system 320 includes security engines 705, including an antivirus engine 715, an IPS/IDS engine 720, a firewall engine 725, and other security engines. The network security system 320 also includes security policies and data 710, including antivirus policies and data 730, IPS/IDS policies and data 735, firewall policies and data 740, and other policies and data. Similarly, the mobile security system 345 includes an antivirus engine 755, an IPS/IDS engine 760, a firewall engine 765, and other engines. The mobile security system 345 also includes security policies and data 535/540, including antivirus security policies and data 770, IPS/IDS security policies and data 775, firewall security policies and data 780, and other security policies and data.

The security administrator 325 includes a wizard 745 for enabling substantially automatic initial and possibly dynamic setup of the security engines 530, security policies 535 and security data 540 on the mobile security system 345. In one embodiment, the wizard 745 may automatically load all security engines 705 and policies and data 710 of the network security system 320 as the security engines 530 and policies and data 535/540 on the mobile security system 345. In another embodiment, the wizard 745 may include all security engines 705 and policies and data 710 except those known to be irrelevant, e.g., those related to billing software used by accounting, those relating to web software running only on the web servers, etc. In another embodiment, the engines 530 would need to be loaded by an IT manager, and would not be loaded automatically by the wizard 745.

In one embodiment, the wizard 745 may determine whether the mobile security system 345 requires a particular security engine 530, e.g., an antivirus engine 755, IPS/IDS engine 760, firewall engine 765, etc. If so determined, then the wizard 745 would load the engine 530 onto the mobile security system 345. The wizard 745 would then determine which policies and data sets, e.g., some for antivirus engine 755, some for the IPS/IDS engine 760, some for the firewall engine 765, etc. are important to the mobile security system 345. The wizard 745 will then determine which of the antivirus policies and data 730 on the network security system 320 are relevant to the antivirus policies and data 770 on the mobile security system 345, which of the IPS/IDS policies and data 735 on the network security system 320 are relevant to the IPS/IDS policies and data 775 on the mobile security system 345, which of the firewall policies and data 740 on the network security system 320 are relevant to the firewall policies and data 780 on the mobile security system 345, and which of the other policies and data on the network security system 320 are relevant to the policies and data on the mobile security system 345. As stated above, the wizard 745 may determine that all security engines 705 or just a subset are needed on the mobile security system 345. The wizard 745 may determine that all policies and data 710 for a given engine type or just a subset should be forwarded. The wizard 745 may determine which relevant policies and data 710 should be forwarded to the mobile security system 345 based on rules developed by an IT manager, based on item-by-item selection during the setup procedure, etc. Alternative to the wizard 745, an IT manager can setup the engines 530 and policies and data 535/540 on the mobile security system 345 without the wizard 745.

The security administrator 325 may also include an update authorities device 750. The update authorities device 750 may obtain security system updates (e.g., signature updates) and may send the updates to the network security system 320 and to the mobile security system 345. One skilled in the art will recognize that the updates to the network security system 320 and the updates to the mobile security system 345 need not be the same. Further, the update authorities device 750 may obtain the updates from security managers, security engine developers, antivirus specialists, etc. The update authorities device 750 may forward the updates to all network security systems 320 and all mobile security systems 345, or may forward routing tables to all mobile security systems 345 and the updates only to an initial set of mobile security systems 345. The initial set of mobile security systems 345 may forward the updates to the mobile security systems 345 identified in the routing tables in a P2P manner, similar to the process illustrated in FIG. 9. As stated above, each mobile security system 345 operating to forward updates is itself acting as an update authorities device 750.

Other applications may be included on the mobile security system 345. For example, add-on applications for recurring revenue from existing customers may include general email, anti-spam, direct and secured email delivery, information vaults, safe skype and other instant messaging services, etc.

Email Security and Anti-spam—implementation of mail relay on mobile security systems 345 (including the web security engine above) and a local spam quarantine (based on SendMail or similar process) may implement a complete mail security suite (SMTP and POP3) including anti-spam with real time indexing (via online web spam quarries). Users may have access to the quarantine to review spam messages, release messages, modify and custom spam rules, etc., via a web interface.

Direct and Secured Email Delivery based on mail relay will allow the mobile security system 345 to send user email directly from one mobile security system 345 to another mobile security system 345 without using in route mail servers. This allows corporate users to send emails that need not travel in the internet, thus leaving trace and duplicates on different unknown mail servers in route. This combined with the ability to use a secured pipe between two mobile security systems is valuable to corporations. Without such methodology, people could trace emails exchange without accessing to the enterprise's mail server, by tracking down copies in intermediate mail servers that were used to deliver the messages.

Information Vault—Application to encrypt and store end user information on the mobile security system 345 may be available only to authorized users via a web interface and a web server implemented on every mobile security system 345 (e.g., BOA, Apache, etc.)

Safe Skype and Other IM—implementing an instant messaging client on the mobile security system 345 can guarantee that the instant messaging system or P2P application has no access to data on the mobile device 310. Adding a chipset of AC/97 to provide a sound interface on the mobile security system 325 could allow users to talk and receive calls directly from/to the mobile security system 325.

Although not shown, a small battery may be included with the mobile security system 345. This battery may be charged by the USB connection during runtime or using the power adapter at any time. The battery may guarantee proper shutdown, e.g., when user disconnects the USB cable from the mobile security system 345. It will be signaled by the system which will launch applications and system shutdown. This will ensure a proper state of the file system and flashing open files buffers.

A multi-layered defense and detection abilities is required. This may be done by a special code that is constantly monitoring the scanning result by different systems (antivirus, IDS/IPS, firewall, antispyware, URL category, etc.) and at different levels to build a puzzle and identify an attack even if its not recognized by each of the individual subsystems. By doing this, the mobile security system 345 will maintain and in some cases even improve the security level provided within the enterprise 540.

One available benefit of the mobile security system 345 is its ability to enforce the policy of the enterprise 540 on the end user while they are traveling or working from home. Since the mobile security system 345 uses similar security engines and policy as when connected from within the enterprise 540 and since the end user cannot access the internet 330 without it (except via VPN connection into the enterprise 540), IT may be capable of enforcing its security policy beyond the boundaries of the enterprise 540. The OS may be under the entire supervision of IT, while the mobile security system 3450S acts as an end user OS under his control. This resolves the problems of who controls what and how security and productivity face minimal compromise.

A standalone version of the mobile security system 345 may offer the same functionality, and may provide a local management interface via web browser. Attractive to home users and small offices that lack an IT department, the mobile security system 345 enables the end user to launch a browser, connect to the mobile security system 345, set the different policies (update policy, security rules, etc.) including modifying the white and black URL lists, etc. There is also an opportunity to provide end users with a service of remote management of the mobile security systems 345 by subscription.

Figure 10A:
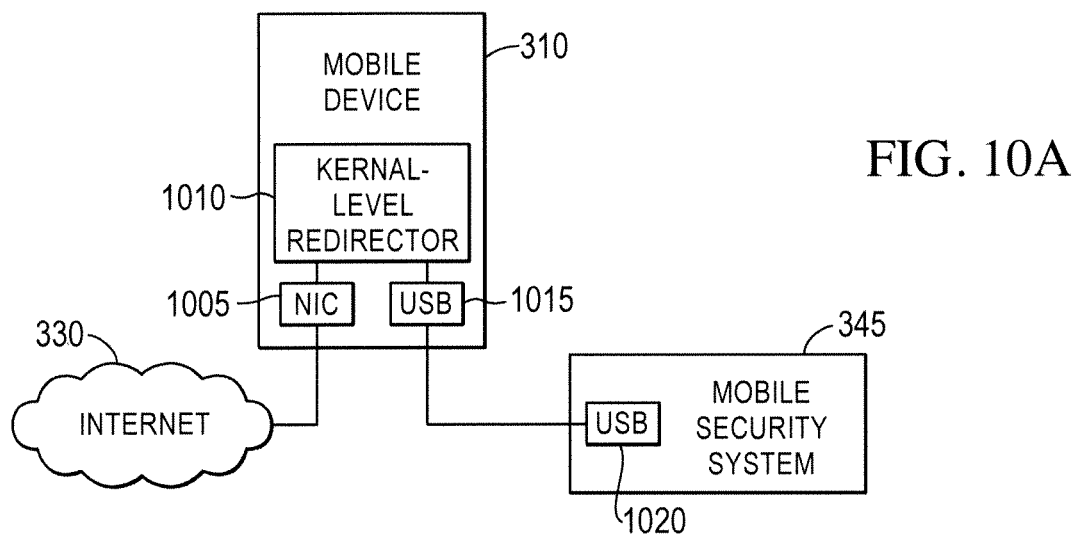
FIGS. 10A-10C are block diagrams illustrating various architectures for connecting a mobile device to a mobile security system, in accordance with various embodiments of the present invention.
Figure 10B:
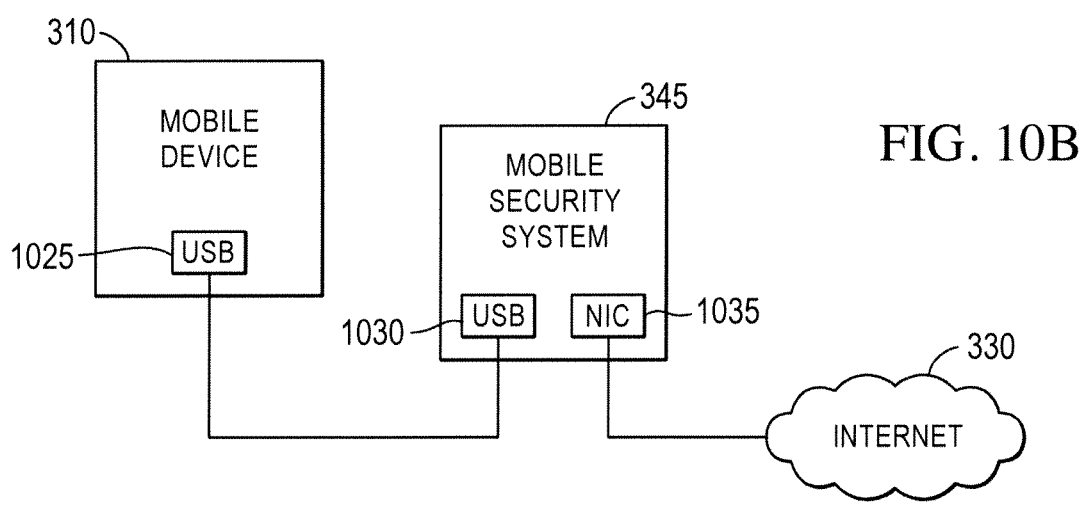
Figure 10C:
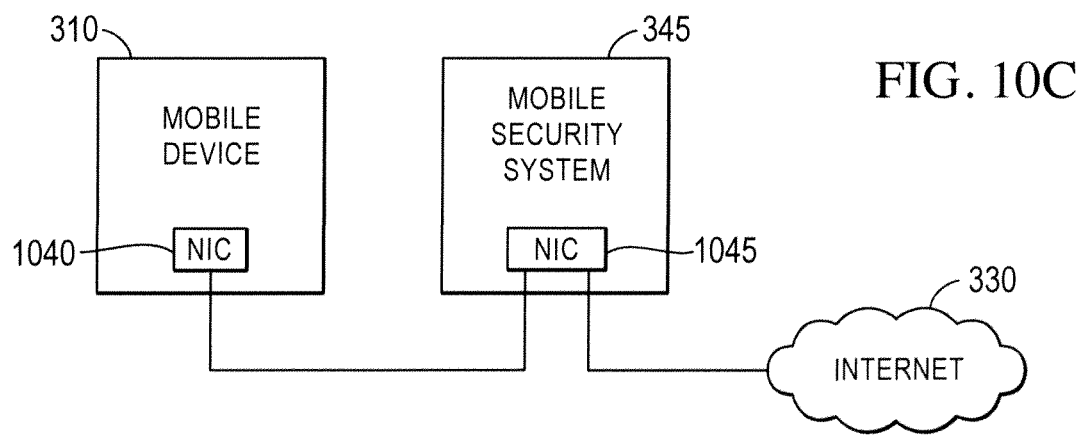

FIGS. 10A, 10B and 10C illustrate three example architectures of connecting a mobile security system 345 to a mobile device 310, in accordance with various embodiments of the present invention. In FIG. 10A, the mobile device 310 is coupled to the mobile security system 345 via USB connections 1015 and 1020 and is coupled to the internet 330 via a NIC card 1005. The mobile device 310 receives internet traffic from the internet 330 via its NIC card 1005. A kernel-level redirector 1010 (e.g., via NDIS, Winsock, etc.) on the mobile device 310 automatically redirects the internet traffic via the USB connections 1015 and 1020 to the mobile security system 345, which scans, cleans and returns the cleaned internet traffic to the mobile device 310 via the USB connections 1015 and 1020. In FIG. 10B, the mobile device 310 is coupled to the mobile security system 345 via USB connections 1025 and 1030. The mobile security system 345 includes a NIC card 1035 for receiving internet traffic from the internet 330. The mobile security system 345 scans, cleans and forwards the internet traffic via the USB connections 1025 and 1030 to the mobile device 310. In FIG. 10C, the mobile device 310 is coupled to the mobile security system 345 via NIC cards 1040 and 1045. The mobile security system 345 receives internet traffic from the internet 330 via its NIC card 1045. The mobile security system 345 scans, cleans and forwards the internet traffic wirelessly via the NIC cards 1040 and 1045 to the mobile device 310. Other connection architectures are also possible. Although not depicted in FIG. 10, those skilled in the art will appreciate that the mobile security system 345 may be communicatively coupled to any communication path, including, in some examples, an internal computer bus, a computer local bus, a memory bus, a network bus, a hard disks bus, a serial bus, or a parallel bus.

Figure 11:
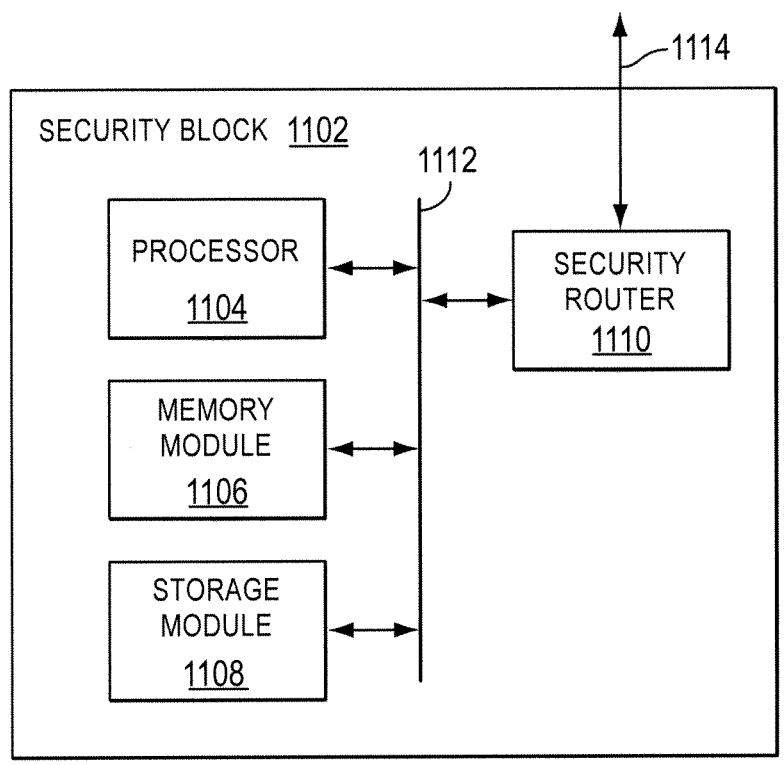
FIG. 11 is a block diagram illustrating details of a security block in some embodiments of the present invention.

FIG. 11 is a block diagram illustrating details of a security block 1102 in some embodiments of the present invention. The security block 1102 comprises a processor 1104, a memory module 1106, a storage module 1108, and a security router 1110 coupled to a bus 1112. The processor 1104 is configured to execute instructions (e.g., programs). The security block 1102 may comprise the mobile security system 345 discussed with respect to FIG. 3 herein.

The security block 1102 may reside in a digital device (e.g., any device with memory and a processor). In various embodiments, the security block 1102 may reside in flash memory devices, communication chips, or processors (e.g., network processors, general purpose processors, communication processors, or DSPs). The security block 1102 may comprise instructions 1116 (e.g., security instructions such as for security applications) associated with a variety of programs (e.g., applications) including a firewall, network address translator (NAT), VPN client, instruction detection and prevention system, HTTP proxy, FTP proxy, POP3 proxy, SMTP proxy, anti-virus program, anti-spyware program, anti-phishing program, anti-spam program, URL CAT, L-8 security engine, MLA security agent, DRM application, anti-leakage program, malicious content filter, multilayerd security monitor, Java monitor, bytecode monitor and/or data access client.

In various embodiments, the processor 1104 is configured by the instructions 1116 to analyze data for the presence of malicious code (e.g., malware). The processor 1104 may comprise circuitry capable of processing the instructions 1116. In some embodiments, the processor 1104 is virtualized. In other embodiments, the processor 1104 comprises a CPU, DSP, FPGA, or any processing unit.

The memory module 1106 includes memory (e.g., RAM, ROM, preboot flash 520, or a ram cache). The instructions 1116 may be loaded into the memory module 1106.

The storage module 1108 is any storage configured to retrieve and store data. Some examples of the storage module 1108 are flash media, hard drives, optical drives, and/or magnetic tape. In some embodiments, the security block 1102 includes a memory module 1106 in the form of RAM and a storage module 1108 in the form of flash memory. Both the memory module 1106 and the storage module 1108 comprise computer readable media which may store instructions or programs that are executable by a computer processor including the processor 1104.

The security router 1110 is any device that receives data over link 1114. In some embodiments, the security router 1110 is coupled to a network (e.g., internet 130) via the link 1114. Further, the security router 1110 may also support wired and/or wireless communication (e.g., 802.11a/b/g/n, WiMax).

The security block 1102 as well as one or more of the components of the security block 1102 (e.g., processor 1104, the memory module 1106, the storage module 1108, and the security router 1110) may be virtualized. Further, those skilled in the art will appreciate that the security block 1102 may be a part of a larger digital device. In one example, the processor 1104 used by the security block 1102 may be the same processor used by the digital device.

Further, the memory module 1106 may comprise all or a portion of RAM memory within a digital device with one or more other components. In one example, a digital device may comprise 2 gigabytes of RAM memory. Some or all of that memory may be shared by the CPU of the digital device and the memory module 1106. In one example, the CPU scans data, cleans data, analyzes data, or otherwise protects the digital device from malware.

Similarly, the storage module 1108 may comprise all or a portion of the storage of the digital device. In one example, the digital device may comprise a one terabyte hard drive. Some or all of the one terabyte hard drive may be shared with the storage module 1108. In one example, the storage of the digital device stores instructions 1116.

Those skilled in the art will appreciate that the security block 1102 may comprise more processors, modules, security routers, and/or other components than those depicted in FIG. 11. Further, the security block 1102 may comprise fewer modules than those depicted in FIG. 11. For example, multiple functions may be performed by a single module.

Figure 12:
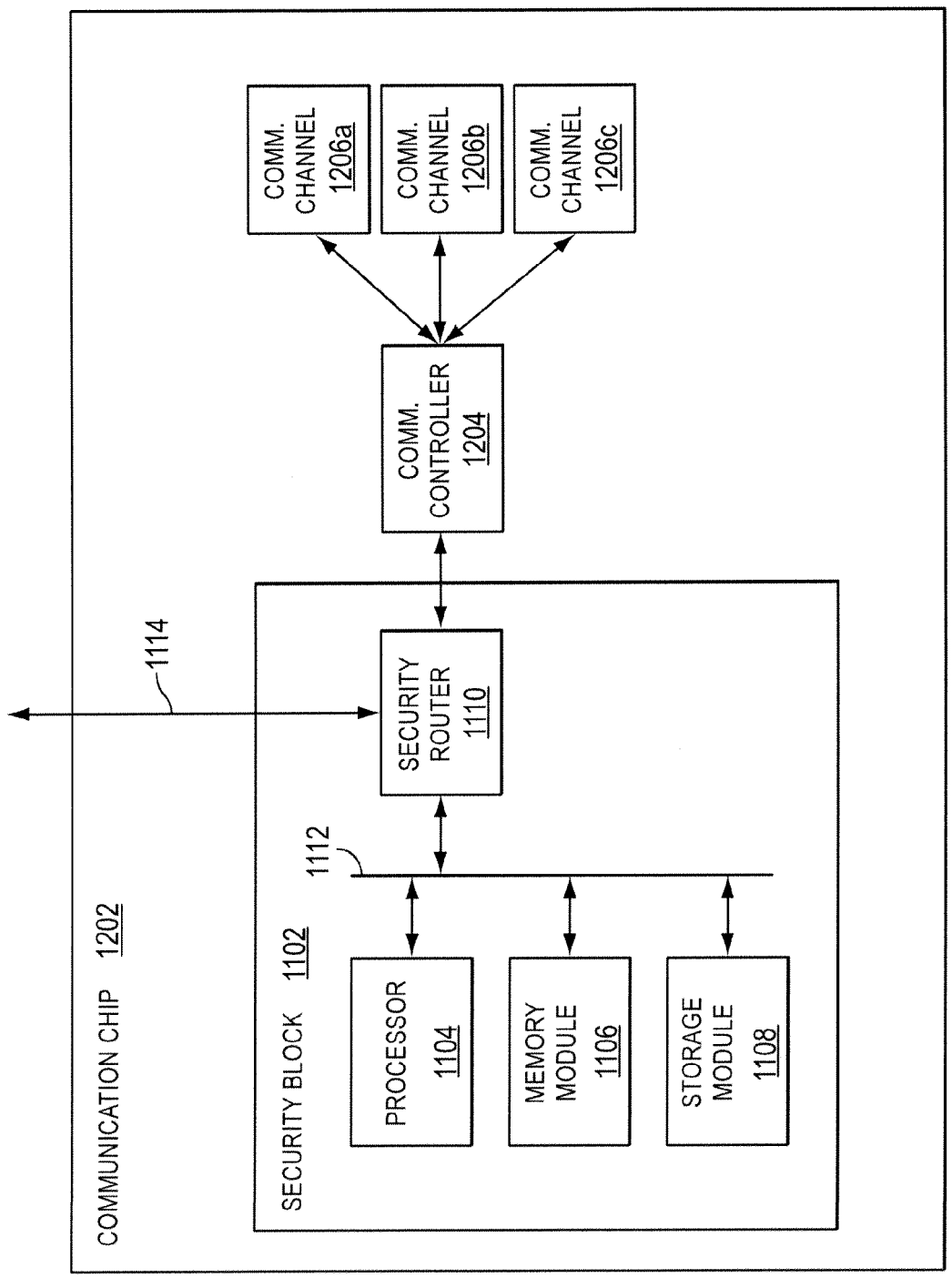
FIG. 12 is a block diagram illustrating a security block on a communication chip in some embodiments of the present invention.

FIG. 12 is a block diagram illustrating a security block 1102 on a communication chip 1202 in some embodiments of the present invention. The communication chip 1202 comprises the security block 1102 operatively connected to a communication controller 1204 which, in turn, is operatively connected to communication channels 1206a-1206c. The communication chip 1202 may be within any digital device such as, for example, a computer, laptop, cell phone, or any digital device in communication with another digital device. Further, the communication chip 1202 may be within or in communication with, for example, a network processor, communication controller, NAS processor, router processor, or wireless communication processor.

In various embodiments, a digital device comprises a processor such as a CPU. The processor 1104 may comprise all or a portion of the processor of the digital device. In one example, the communication chip 1202 may be in communication with the processor within the digital device. The processor 1104 within the security block 1102 may comprise all or a portion of the processor within a digital device (e.g., the digital device and the security block 1102 share the same processor).

In various embodiments, the communication chip 1202 receives data to be distributed over one or more communication channels (e.g., comm. channel 1206a-1206c). Data may also be received from the communication channels to be provided over link 1114 (e.g., to a network in communication with the communication chip 1202).

In various embodiments, untrusted data is received by the communication chip 1202 from a network (not depicted) over the link 1114. The security router 1110 of the security block 1102 may receive the data from the link 1114. The processor 1104 may process the untrusted data using instructions associated with one or more security programs. The instructions may be loaded in the memory module 1106. In one example, the instructions comprise an antivirus program that instructs the processor 1104 to scan the untrusted data for malware. In some embodiments, once the process by the processor 1104 is completed, the security router 1110 will provide the trusted data (i.e., data that has been processed by the processor 1104 using instructions associated with the one or more security programs) to the communication controller 1204. The communication controller 1204 may provide the trusted data to one or more communication channels (e.g., communication channels 1206a-1206c). In one example, the communication controller 1204 functions as a standard communication controller on a standard communication chip when data is received.

In various embodiments, the processor 1104 executes one or more various security programs while processing the untrusted data. These one or more security programs include, for example, a firewall, network address translator (NAT), VPN client, intrusion detection and prevention system, HTTP proxy, FTP proxy, POP3 proxy, SMTP proxy, anti-virus program, anti-spyware program, anti-phishing program, anti-spam program, URL CAT, L-8 security engine, MLA security agent, DRM application, anti-leakage program, malicious content filter, multilayerd security monitor, Java monitor, bytecode monitor and/or data access client.

In one example, the processor 1104 executes a firewall that prevents the security router 1110 from routing data to the communication controller 1204. In another example, the processor 1104 executes an antivirus program that scans and removes viruses from untrusted data. The cleaned data (i.e., trusted data) may be provided by the security router 1110 to the communication controller 1204.

Further, in some embodiments, untrusted data may be received by the communication chip 1202 over one or more of the communication channels 1206a-1206c. The untrusted data may then be received by the communication controller 1204 and provided to the security router 1110. The processor 1104 then processes the untrusted data with instructions associated with one or more security programs to produce trusted data. The security router 1110 may then transmit the trusted data over the link 1114.

Those skilled in the art will appreciate that the communication chip 1202 may comprise any number of components beyond those displayed in FIG. 12. Further, those skilled in the art will appreciate that the communication chip 1202 may comprise fewer components than those displayed in FIG. 12. For example, the communication chip 1202 may include only one or two communication channels. Further, multiple functions may be combined into one or more components.

Figure 13:
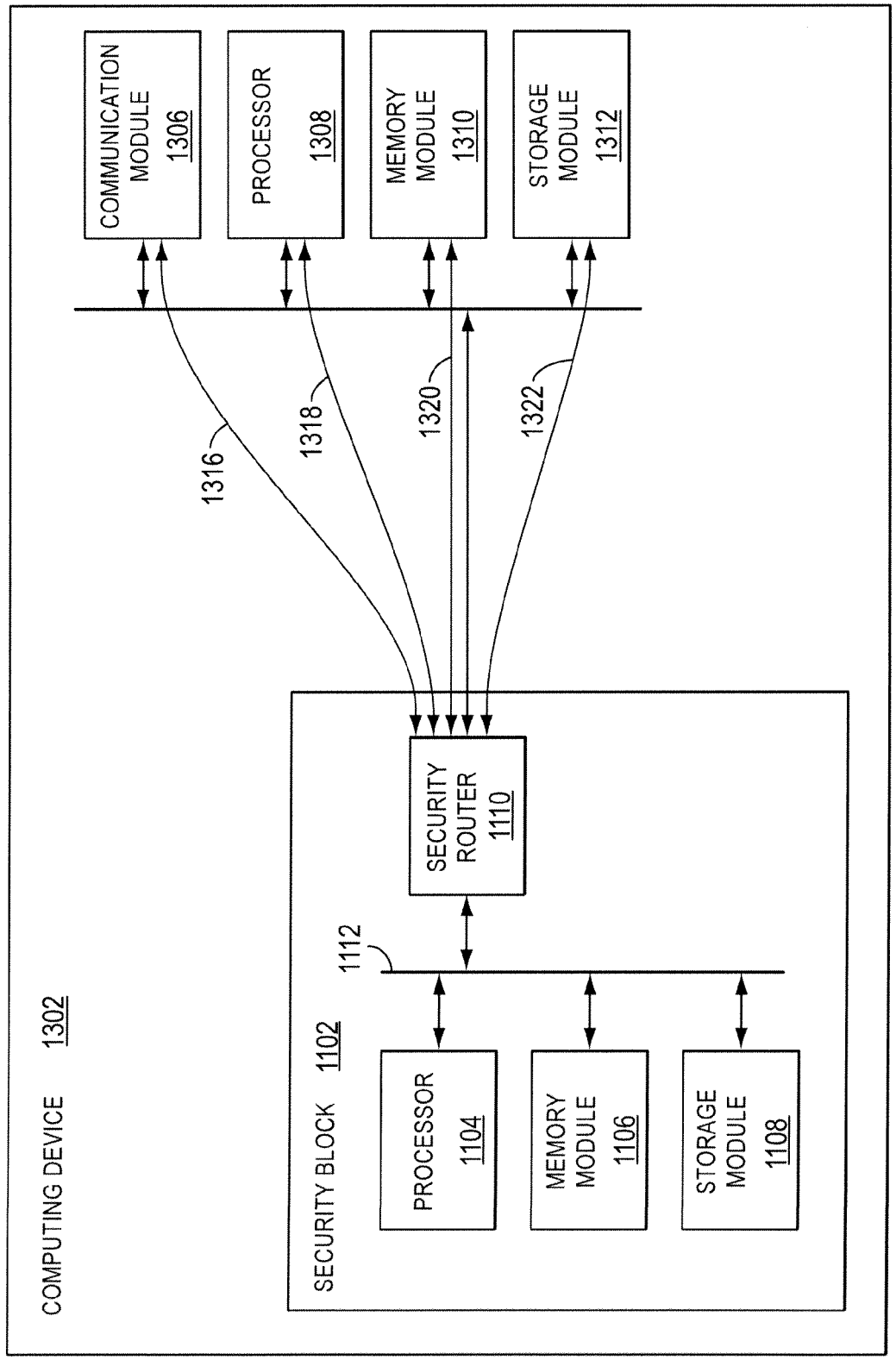
FIG. 13 is a block diagram illustrating a security block on a computing device in some embodiments of the present invention.

FIG. 13 is a block diagram illustrating a security block 1102 on a computing device 1302 in some embodiments of the present invention. The computing device 1302 comprises the security block 1102 operatively connected to an internal or local bus 1304 which, in turn, is operatively connected to a communication module 1306, a processor 1308, a memory module 1310, and a storage module 1312. Data may flow between the internal or local bus 1304 and the communication module 1306, processor 1308, memory module 1310, and storage module 1312 via paths 1316, 1318, 1320, and 1322, respectively. Paths 1316, 1318, 1320, and 1322, represent different data flows between the internal or local bus 1304 and the communication module 1306, processor 1308, memory module 1310, and storage module 1312. Each path 1316, 1318, 1320, and 1322 may flow over one or more connections between the security router 1110 and the internal or local bus 1304.

In various embodiments, the computing device 1302 is modified to route data and content between the security block 1102 and the communication module 1306, the processor 1308, the memory module 1310, and the storage module 1312. In one example, the computing device 1302 performs security checks and performs malicious content removal on the fly. In various embodiments, the computing device 1302 comprises a PC, desktop PC, Mobile Phone, Server, network processor, communication controller, NAS processor, router processor, wireless communication processor, or digital device etc.

In various embodiments, the communication module 1306 is any interface configured to communicate data between the computing device 1302 and a digital device. The processor 1308 may be similar to the processor 1104. In one example, the processor 1308 is virtualized. In other examples, the processor 1306 comprises a CPU, DSP, FPGA, or any processing unit. In some embodiments, the processor 1306 and the processor 1104 may be the same processor.

The memory module 1310 may be similar to the memory module 1106. In one example, the memory module 1310 includes memory (e.g., RAM, ROM, preboot flash 520, or a ram cache). In some embodiments, the memory module 1310 and the memory module 1106 may be the same memory.

The storage module 1312 may be similar to the storage module 1108. In one example, the storage module 1312 may be any storage configured to retrieve and store data. Some examples of the storage module 1312 are flash media, hard drives, optical drives, and/or magnetic tape. In some embodiments, the storage module 1312 and the storage module 1108 may be the same storage.

Those skilled in the art will appreciate that the computing device 1302 may comprise more or less blocks, processors, and modules, than depicted in FIG. 13. In some embodiments, the functions of the modules depicted may be combined into fewer modules. Functions of one or more modules may also be performed by any number of modules. Further, it will be appreciated that the computing device 1302 may include a number of functions not identified in the drawings. In one example, the computing device 1302 may comprise a display module configured to display images to a user. In another example, the computing device 1302 may comprise an I/O module configured to communicatively couple a keyboard, or any input or output device to the internal or local bus 1304.

Figure 14:
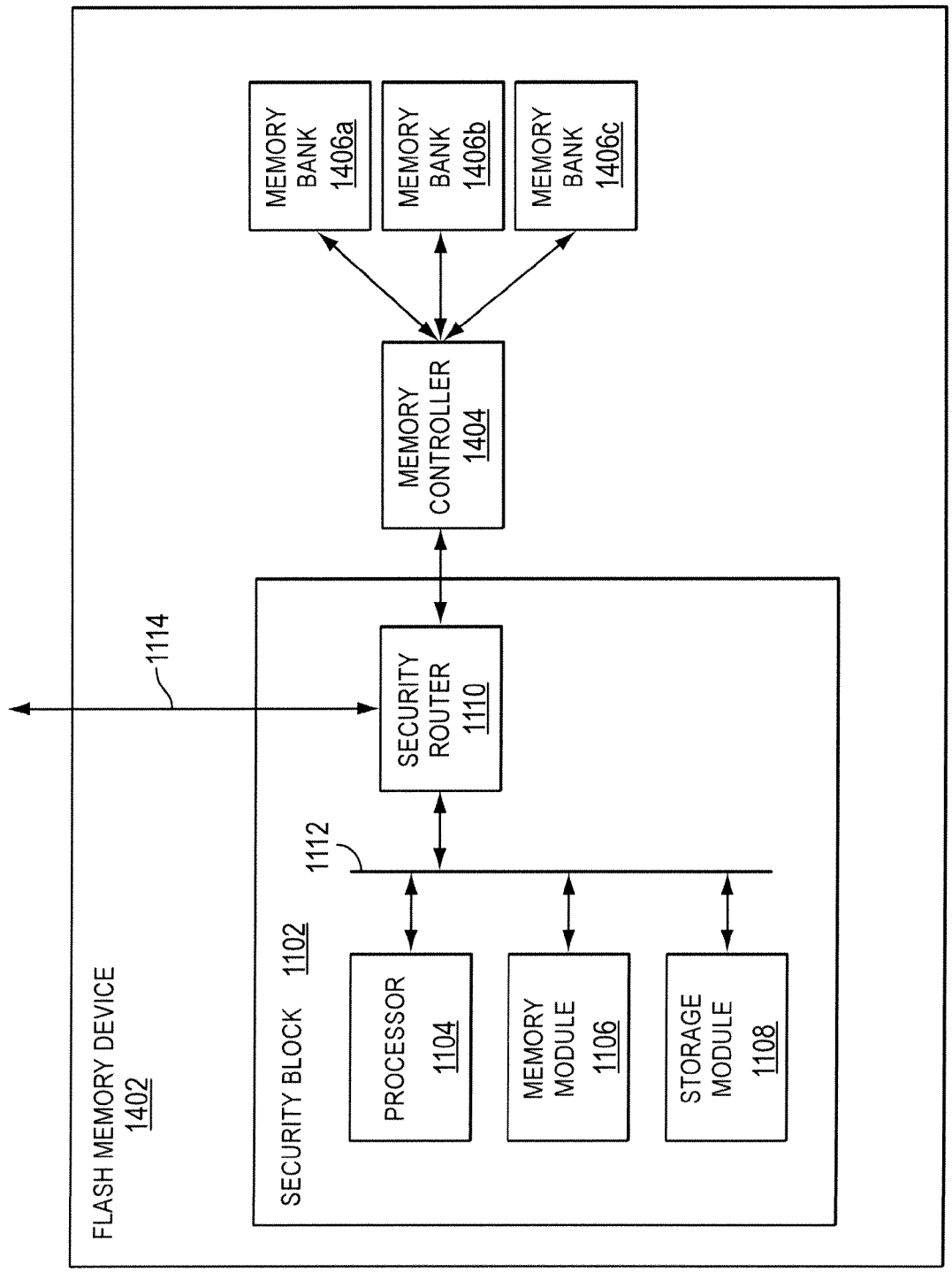
FIG. 14 is a block diagram illustrating a security block on a flash memory device in some embodiments of the present invention.

FIG. 14 is a block diagram illustrating a security block 1102 on a flash memory device 1402 in some embodiments of the present invention. The flash memory device 1402 may comprise the security block 1102 in operative communication with the memory controller 1404 which is operatively connected to the memory banks 1406a-1406c. The flash memory device 1402 may be in any digital device, (e.g., a computer, laptop, PDA, or cell phone) or memory device (e.g., memory stick or flash drive).

In various embodiments, the flash memory device 1402 receives data to be stored in the memory banks 1406a-1406c. The memory banks 1406a-1406c may comprise any kind of flash memory, including, but not limited to, NAND or NOR flash. Further, the memory banks 1406a-1406c may comprise different kinds of flash memory (e.g., bank 1406A may comprise NAND flash memory and bank 1408B may comprise NOR flash memory).

In various embodiments, untrusted data is received by the flash memory device 1402 from a network or digital device (not depicted) over a memory data bus operatively coupled to the link 1114. In one example, the security router 1114 intercepts untrusted data associated with a write command. The security router 1110 of the security block 1102 may receive the data from the link 1114. The processor 1104 may process the untrusted data using instructions associated with one or more security programs. In some embodiments, once the process by the processor 1104 is completed, the security router 1110 will provide the trusted data to the memory controller 1404. The memory controller 1404 may then function as a standard memory controller and provide the trusted data to one or more memory banks (e.g., memory banks 1406a-1406c).

Further, in some embodiments such as when a read command is executed to read data from the memory bank(s), untrusted data may be received by the memory controller 1404 from the media banks 1406a-1406c and provided to the security router 1110. The processor 1104 then processes the untrusted data with instructions associated with one or more security programs to produce trusted data. The security router 1110 may then transmit the trusted data over the link 1114.

Those skilled in the art will appreciate that the flash memory device 1402 may comprise any number of components beyond those displayed in FIG. 14. Further, those skilled in the art will appreciate that the flash memory device 1402 may comprise fewer components than those displayed in FIG. 14. For example, the flash memory device 1402 may include only one or two memory banks. Further, multiple functions may be combined into one or more components.

Although FIG. 14 depicts three memory banks 1406a-1406c, the flash memory device 1402 may comprise any number of memory banks. In one example, the flash memory device 1402 includes only one memory bank. In another example, the flash memory device 1402 may comprise a single module of flash memory that is logically divided into one or more memory banks.

In some embodiments, the one or more of the memory banks 1406a-1406c are shared by the memory module 1106 and/or the storage module 1106. In one example, a portion of the memory bank 1406a may be protected (e.g., a portion of memory in the memory bank 1406a is read-only). The protected portion of memory within memory bank 1406a may function as the memory module 1106 and/or the storage module 1108 (e.g., a place in memory in which instructions associated with one or more security programs are stored and/or loaded).

Those skilled in the art will appreciate that device disclosed in FIG. 14 may not be limited to flash memory but may process data between a processor and any memory storage, including, for example, RAM, a hard drive, CD ROM, or any other kind of computer readable storage.

Figure 15:
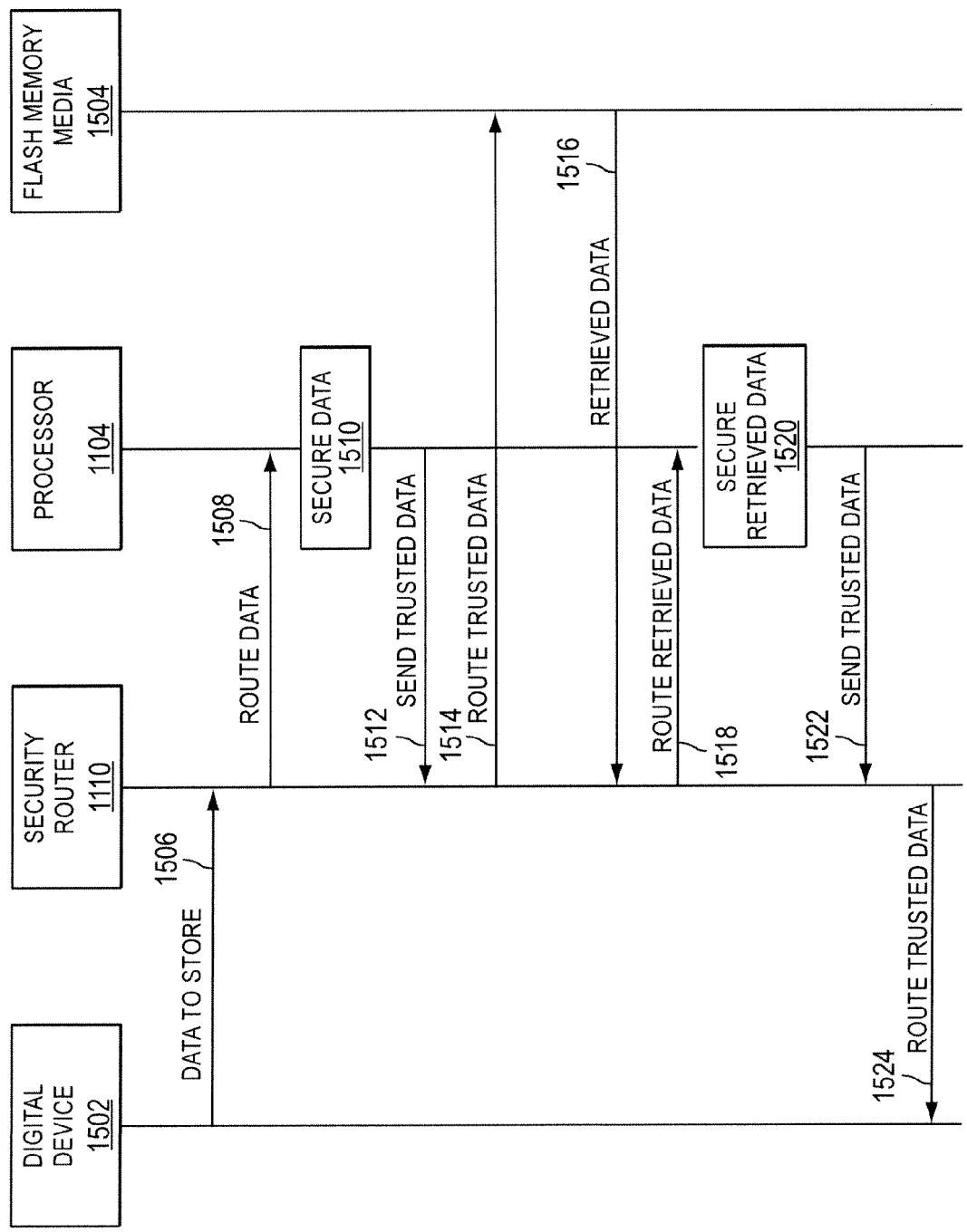
FIG. 15 is a block diagram illustrating the flow of data between a digital device and flash memory in some embodiments of the present invention.

Although FIGS. 14 and 15 depict a communication chip and a flash memory, respectively, those skilled in the art will appreciate that the security router 1110 may be placed within the flow of data between any source and any destination. The data is processed by the processor 1104 before the data is allowed to continue to the destination. The destination may be, for example, another digital device, data storage (e.g., a hard drive), or RAM. For example, in some embodiments, the security router 1110 may provide trusted data for storage over a network (e.g., to a storage area network) or for storage with a storage device with which the security router 1110 is communicatively coupled.

FIG. 15 is a block diagram illustrating the flow of data between a digital device 1502 and flash memory media 1504 in some embodiments of the present invention. In various embodiments, the flash memory media 1504 may be contained in a thumb drive such as a memory stick coupled via a USB port. The digital device 1502 may be any device with a processor and memory including, for example, a computer or laptop. In one example, a user plugs a flash device containing the flash memory media 1504 into a USB port of the digital device 1502. The user may then proceed to store data on the flash memory media 1504. Prior to storing the data on the flash memory media 1504, the data may be processed using one or more security programs. Similarly, prior to data being retrieved from the flash memory media 1504 by the digital device 1502, the data may be processed using the one or more security programs.

In some embodiments, once the data is trusted (e.g., processed using the security programs prior to storage), the trusted data is retrieved by the digital device 1502 and further processing is not performed. In one example, the security router 1110 is configured to make the determination whether received data is trusted or untrusted prior to processing.

In step 1506, the security router 1110 receives untrusted data from the digital device 1502. In one example, data to be stored in the flash memory media 1504 is intercepted by the security router 1110. The security router 1110 may then identify the data as untrusted. In one example, the security router 1110 is configured to determine the source of the data and whether the data has been previously processed with one or more security programs. In step 1508, the security router 1110 provides the data to the processor 1104. In one example, the security router 1110 provides only untrusted data for processing by the processor 1104.

In step 1510, the processor 1104 secures the data by processing the untrusted data using instructions associated with one or more security programs. In some embodiments, the untrusted data may be quarantined or blocked from being stored in the flash memory media 1504. In one example, malware, such as a virus, is found in the untrusted data. Information regarding the infection may be logged and an alarm provided to the user of the digital device. The untrusted data may then be stored (for further analysis, for example) or deleted.

Assuming that some or all of the untrusted data is not adversely affected by malware, the processor 1104 sends the portion of unaffected data (i.e., trusted data) to the security router 1110 in step 1512. The security router 1110 may determine that the recently received data is trusted (e.g., by virtue of receiving the data from the processor 1104 of the security block 1102), and then route the trusted data to the flash memory media 1504 in step 1514. The flash memory media 1504 may then store the trusted data.

In some embodiments, the digital device 1502 retrieves data from the flash memory media 1504. The retrieved data may comprise all, some, or none of the data that was previously stored in the flash memory media 1504 in steps 1506-1514.

In step 1516, the security router receives the data (e.g., via the memory controller 1404) from the flash memory media 1504. In some embodiments, the security router 1110 determines if the data has been previously processed with instructions associated with the one or more security programs prior to storage. If the data had been previously processed with the instructions, then the security router 1110 may provide the data to the digital device 1502 without further processing. However, if the data had not been previously processed or the data was previously processed by instructions associated with out-of-date security programs (e.g., the virus definitions of an anti-virus program are not current), then the security router 1110 may provide the data to the processor 1104 for processing in step 1518.

In step 1520, the processor 1104 secures the retrieved data. In one example, the processor 1104 processes the retrieved data with instructions (i.e., associated with the security programs) loaded into the memory module 1106. the processor 1104 may send data that is not affected by malware or a hacker (e.g., trusted data) to the security router 1110 in step 1522. The security router 1110 may then route the trusted data to the digital device 1502 in step 1524.

Figure 16:
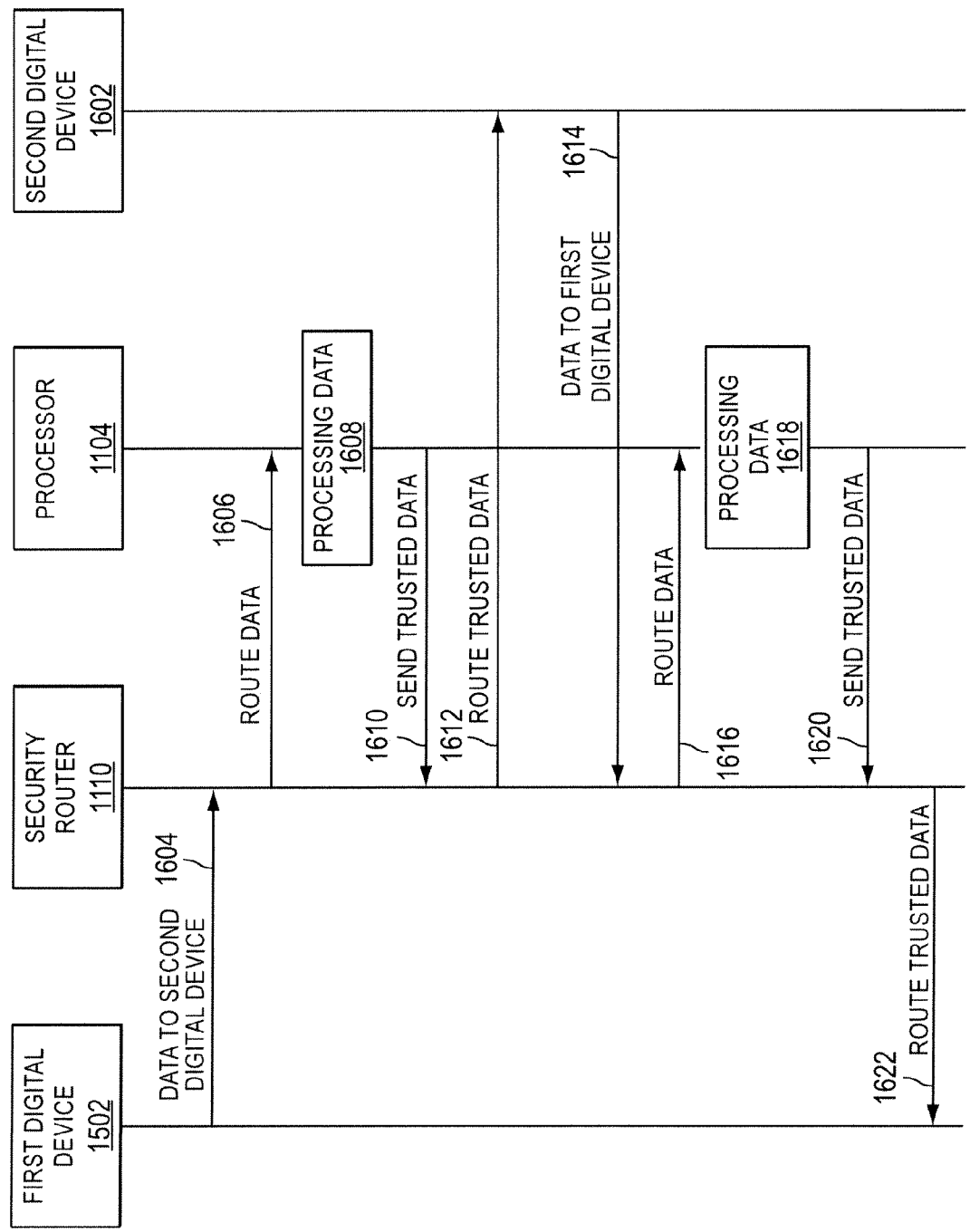
FIG. 16 is a block diagram illustrating the flow of data between two digital devices in some embodiments of the present invention.

FIG. 16 is a block diagram illustrating the flow of data between two digital devices in some embodiments of the present invention. In step 1604, the security router 1110 intercepts data from the first digital device 1502 sent to the second digital device 1602. In some embodiments, the security router 1110 may be within or coupled to the first digital device 1502, within or coupled to the second digital device 1602, or between the two devices. In an example, the security router 1110 is within a network router that routes data to and from the digital devices. In another example, the security router 1110 is within a communication chip that controls communication with the first digital device 1502 and/or the second digital device 1602.

In step 1606, the security router 1110 routes the intercepted untrusted data to the processor 1104. In some embodiments, the security router 1110 may scan data received by the security router 1110 to determine if the data has already been processed by the processor 1104. If the data has already been processed by the processor 1104, then the security router 1110 may provide the data to the second digital device 1602 without passing the data to the processor 1104.

In step 1608, the processor 1104 processes the untrusted data from the security router 1110 with instructions related to one or more security programs. If the untrusted data does not contain malware or the untrusted data is not associated with malware, a hacker, or an unauthorized user, the processor 1104 may send the trusted data back to the security router 1110 in step 1610. In one example, a malware bot resident on the first digital device 1502 may send out packets of data to probe open ports on the second digital device 1602. The security router 1110 may intercept the probe packets and provide the packets to the processor 1104 which determines that the data is either associated with a bot or related to forbidden activity (i.e., probing open ports). The processor 1104 may, for example, instruct the security router 1110 to log the event, quarantine the probe packets, and/or delete the probe packets.

In various embodiments, the processor 1104 may scan the untrusted data to determine if the intended recipient of the data is authorized to receive the data. In one example, the processor 1104 may check if the untrusted data is confidential and that the intended receiver is authorized to receive the data in order to prevent the leakage of confidential information. If the receiver is not authorized to receive the data, the data may be barred from being sent (e.g., data transmission is denied or stopped).

In some embodiments, the processor 1104 may return trusted data to the security router 1110 with an indicator, such as a flag, to indicate to the security router 1110 that the data from the processor 1104 is trusted and/or has been processed. The security router 1110 may route the trusted data to the second digital device 1602 in step 1612.

As discussed herein, in various embodiments, the same security router 1110 may intercept data sent from the first digital device 1502 to the second digital device 1602 as well as intercept data sent from the second digital device 1602 to the first digital device 1502. In step 1614, the security router 1110 intercepts untrusted data sent by the second digital device 1602 to the first digital device 1502. The security router 1110 may then route the untrusted data to the processor 1104 in step 1616.

In step 1618, the processor 1104 processes the untrusted data with the instructions associated with one or more security programs. Trusted data (e.g., data that is not affected by malware or is otherwise unrelated to malware) is sent to the security router 1110 in step 1620. The security router 1110 may then route the trusted data to the first digital device 1502 in step 1622.

Figure 17:
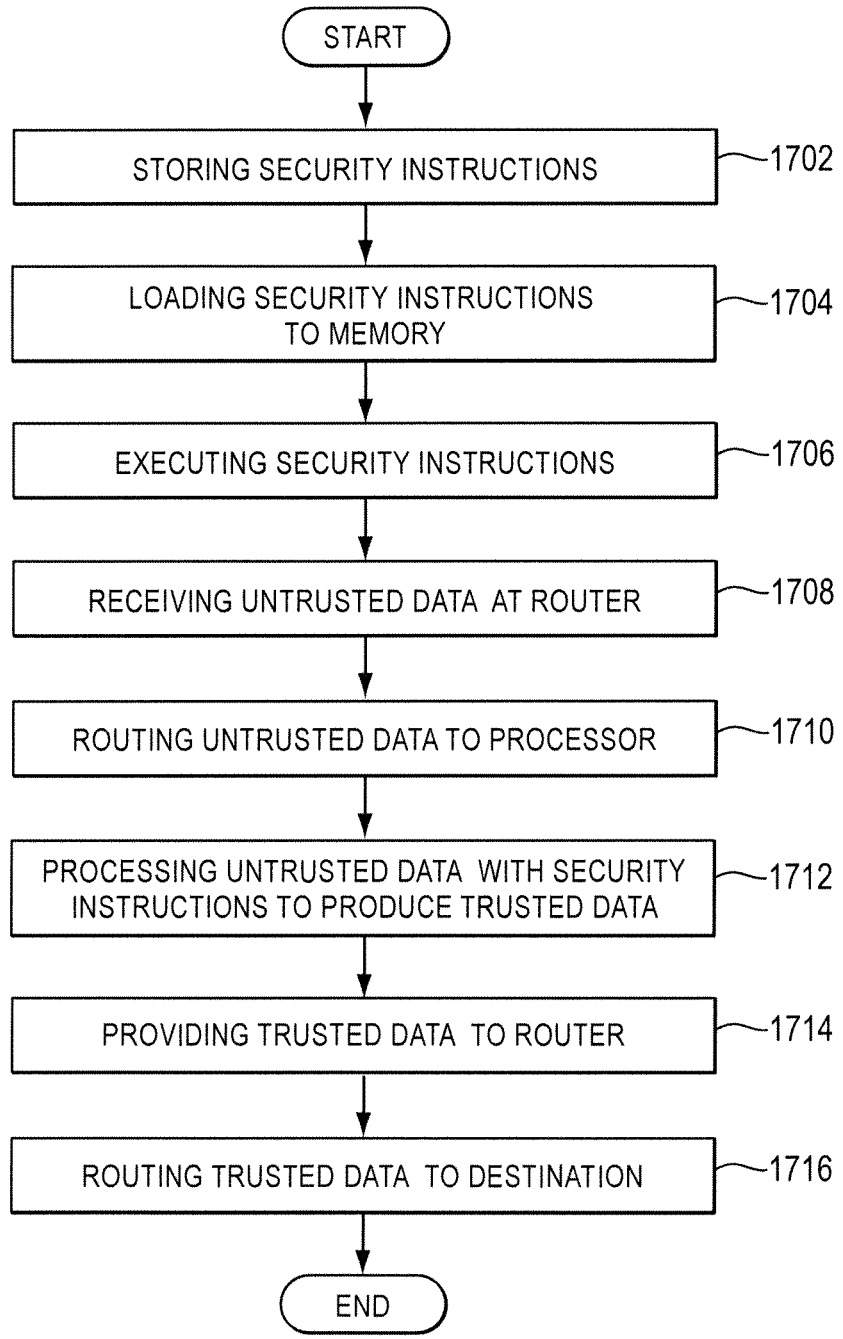
FIG. 17 is a flowchart describing the function of the security block in some embodiments of the present invention.

FIG. 17 is a flowchart describing the function of the security block 1102 in some embodiments of the present invention. In step 1702, the security block 1102 stores the security instructions. In one example, the security instructions (i.e., instructions associated with one or more security programs) are stored in the storage module 1108. The security instructions may be stored in a protected memory such that the security instructions may not be altered or corrupted by malware, a hacker, or an unauthorized user. Further, the security instructions may be protected such that they may not be altered or corrupted unintentionally by a user.

In step 1704, the security instructions are loaded from the storage into memory. In some embodiments, the security instructions are loaded from the storage module 1108 to the memory module 1106. For example, the storage module 1108 may comprise ROM and the memory module 1106 may comprise RAM.

In some embodiments, the security instructions are loaded from the protected storage module 1108 to the memory module 1106 upon startup, bootup, or reboot of the security block 1102. The security instructions may include instructions for executing one or more security programs as well as an operating system and/or any data necessary to execute the security programs. In some embodiments, all data necessary to execute the one or more security programs are loaded from protected storage to RAM so that the security instructions used to process untrusted data are not corrupted or adversely affected by malware, system error, and/or users.

In step 1706, the processor 1104 executes the security instructions. In one example, the processor 1104 boots an operating system and executes the security programs from the protected storage to prepare to receive untrusted data from the security router 1110.

In step 1708, the security router 1110 receives untrusted data. In various embodiments, the security router 1110 intercepts untrusted data between the untrusted data's source and the untrusted data's destination. The security router 1110 may receive and/or intercept data, in some examples, between two digital devices, between a processor such as a CPU and storage, or between a processor and memory. In step 1710, the security router 1110 routes the untrusted data to the processor 1104.

In step 1712, the processor 1104 processes the untrusted data to produce trusted data. In various examples, the processor 1104 executes the security instructions loaded from storage to the memory to process the untrusted data. In one example, the processor 1104 scans the untrusted data for a virus. If the untrusted data comprises a virus, the processor 1104 may, based on the security instructions for an anti-virus program, remove the virus from the untrusted data, quarantine the untrusted data, delete the untrusted data, and/or log information regarding the virus. The processor 1104 may provide the unaffected remaining data (i.e., the trusted data), if any data exists after processing, back to the security router 1110 in step 1714.

In step 1716, the security router 1110 may then route the trusted data to the data's original destination. In some embodiments, the processor 1104 may instruct the security router 1110 to take one or more actions including, but not limited to, quarantining the original untrusted data, logging information about the original untrusted data, and/or barring data received from the source of the original untrusted data.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

Further, the each term "comprising," "including," "having," "with," and "containing" is inclusive or open-ended and does not exclude additional, unrecited elements or method steps.

The invention claimed is:

1. A system, comprising:
at least one chip configured to be installed in a mobile device, the at least one chip comprising:
an intercepting device configured to intercept untrusted data from an untrusted portion of a network, the intercepting occurring before execution by a mobile device processor of the mobile device;
a security engine configured to provide security instructions operative to implement a security policy, the security instructions for providing internet gateway security for the mobile device, the internet gateway security including a firewall for the mobile device, the firewall for providing in accordance with the security policy pre-runtime security protection from malicious code in the untrusted data; and
a dedicated security system processor dedicated to security functions and configured to execute the security engine, thereby enabling the security engine to receive the untrusted data from the intercepting device, to evaluate the untrusted data for violations of the security policy to identify trusted data from the untrusted data in accordance with the security policy, and to provide the trusted data to the intercepting device for transmission to the mobile device processor for execution.

2. The system of claim 1, wherein the security instructions comprise an operating system stored in a preboot memory of the at least one chip.

3. The system of claim 1, wherein the security instructions are stored in a protected memory of the at least one chip.

4. The system of claim 1, wherein the security instructions are loaded into RAM of the mobile device.

5. A system, comprising:
a mobile device comprising:
an internal bus;
a mobile device processor communicatively coupled to the internal bus;
a memory module communicatively coupled to the internal bus;
a storage module communicatively coupled to the internal bus;
a communication module communicatively coupled to the internal bus;
an intercepting device configured to intercept untrusted data from an untrusted portion of a network, and from the memory module, the storage module, or the communication module, the intercepting occurring before execution of the untrusted data by the first mobile device processor;
a security engine configured to provide security instructions operative to implement a security policy, the security instructions for providing internet gateway security for the mobile device, the internet gateway security including a firewall for the mobile device, the firewall for providing in accordance with the security policy pre-runtime security protection from malicious code in the untrusted data; and
a dedicated security system processor dedicated to security functions and configured to: execute the security engine, thereby enabling the security engine to receive the untrusted data from the intercepting device, to evaluate the untrusted data for violations of the security policy to identify trusted data from the untrusted data in accordance with the security policy, and to provide the trusted data to the router intercepting device for transmission to the first mobile device processor for execution.

6. The system of claim 5, wherein the security instructions comprise an operating system stored in a preboot memory of the mobile device.

7. The system of claim 5, wherein the security instructions are stored in a protected portion of the memory module or a protected portion of the storage module.

8. The system of claim 5, wherein the security instructions are loaded into RAM of the memory module within the mobile device.

9. The system of claim 5, wherein the mobile device is within a USB memory device.

10. A system, comprising:
a flash memory device comprising:
flash memory media;
an intercepting device configured to intercept untrusted data from an untrusted portion of a network, the intercepting occurring before execution by a mobile device processor of a mobile device;
a security engine configured to provide security instructions operative to implement a security policy, the security instructions for providing internet gateway security for the mobile device, the mobile internet gateway security including a firewall for the mobile device, the firewall for providing in accordance with the security policy pre-runtime security protection from malicious code in the untrusted data; and
a dedicated security system processor dedicated to security functions and configured to execute the security engine, thereby enabling the security engine to: receive the untrusted data from the intercepting device, to evaluate the untrusted data for violations of the security policy to identify trusted data from the untrusted data in accordance with the security policy, and to provide the trusted data to the intercepting device for transmission to the mobile device processor for execution.

11. The system of claim 10, wherein the security instructions comprise an operating system stored in a preboot memory of the flash memory device.

12. The system of claim 10, wherein the security instructions are stored in a protected portion of the flash memory media.

13. The system of claim 10, wherein the security instructions are loaded into RAM of the flash memory device.

14. The system of claim 10, wherein the flash memory device is within a USB memory device.

15. A method, comprising:
storing security instructions operative to implement a security policy, the security instructions providing internet gateway security for a mobile device, the internet gateway security including a firewall for the mobile device, the firewall for providing in accordance with the security policy pre-runtime security protection from malicious code in untrusted data, the untrusted data from an untrusted portion of a network;
loading the security instructions into a memory;
executing the security instructions with a dedicated security system processor dedicated to security functions;
intercepting, with an intercepting device in a communication chip, the untrusted data before execution by a mobile device processor of the mobile device;
routing the untrusted data from the intercepting device to the dedicated security system processor;
evaluating the untrusted data for violations of the security policy with the dedicated security system processor executing the security instructions to identify trusted data from the untrusted data in accordance with the security policy; and
providing the trusted data from the dedicated security system processor to the intercepting device for transmission to the first mobile device processor for execution.

16. The method of claim 15, wherein the security instructions comprise an operating system stored in a preboot portion of the memory.

17. The method of claim 15, wherein the security instructions are stored in a protected portion of the memory.

18. The method of claim 15, wherein the memory comprises RAM of a digital device.

19. The method of claim 15, wherein the communication chip is within a network interface card.

20. A method, comprising:
storing security instructions operative to implement a security policy, the security instructions providing internet gateway security for a mobile device, the internet gateway security including a firewall for the mobile device, the firewall for providing in accordance with the security policypre-runtime security protection from malicious code in untrusted data, the untrusted data from an untrusted portion of a network;
loading the security instructions into a memory;
executing the security instructions with a dedicated security system processor dedicated to security functions;
intercepting, with an intercepting device contained in a flash memory device, the untrusted data before execution by a mobile device processor of the mobile device;
routing the untrusted data from the intercepting device to the dedicated security system processor;
evaluating the untrusted data for violations of the security policy with the dedicated security system processor executing the security instructions to identify trusted data from the untrusted data in accordance with the security policy; and
providing the trusted data from the dedicated security system processor to the intercepting device for transmission to the mobile device processor for execution.

21. The method of claim 20, wherein the security instructions comprise an operating system stored in a preboot memory of the flash memory device.

22. The method of claim 20, wherein the security instructions are stored in a protected portion of flash memory media of the flash media device.

23. The method of claim 20, wherein the security instructions are loaded into RAM of the flash memory device.

24. The method of claim 20, wherein the flash memory device is within a USB memory device.

25. A non-transitory computer readable medium configured to store instructions in a communication chip, the instructions executable by a dedicated security system processor to perform a method, the dedicated security system processor dedicated to security functions, and the method comprising:
before execution by a mobile device processor of a communication chip coupled to a mobile device, intercepting, using an intercepting device, untrusted data from an untrusted portion of a network;

routing the untrusted data to the dedicated security system processor;

evaluating the untrusted data with the dedicated security system processor executing security instructions operative to implement a security policy, the security instructions providing internet gateway security for the mobile device, the internet gateway security including a firewall for the mobile device, the firewall for providing in accordance with the security policy pre-runtime security protection from malicious code in the untrusted data, the security instructions checking for violations of the security policy, and the security instructions operative to identify trusted data from the untrusted data in accordance with the security policy; and providing the trusted data from the dedicated security system processor to the mobile device processor for execution.

26. A non-transitory computer readable medium configured to store instructions in a flash memory device, the instructions executable by a dedicated security system processor to perform a method, the method comprising:

before execution by a mobile device processor of flash memory media of a flash memory device coupled to a mobile device, intercepting, using an intercepting device, untrusted data from an untrusted portion of a network;

routing the untrusted data to the dedicated security system processor;

evaluating the untrusted data with the dedicated security system processor executing security instructions operative to implement a security policy, the security instructions providing internet gateway security for the mobile device, the internet gateway security including a firewall for the mobile device, the firewall for providing in accordance with the security policy pre-runtime security protection from malicious code in the untrusted data, the security instructions checking for violations of the security policy, and the security instructions operative to identify trusted data from the untrusted data in accordance with the security policy; and providing the trusted data from the dedicated security system processor to the mobile device processor for execution.

* * * * *

UNITED STATES PATENT AND TRADEMARK OFFICE
CERTIFICATE OF CORRECTION

PATENT NO. : 8,869,270 B2  Page 1 of 1
APPLICATION NO. : 12/402443
DATED : October 21, 2014
INVENTOR(S) : Shlomo Touboul It is certified that error appears in the above-identified patent and that said Letters Patent is hereby corrected as shown below:

In the Claims:

Claim 5, column 24, lines 56-57:
"untrusted data by the first mobile device processor" should read -- untrusted data by the mobile device processor --.

Claim 5, column 25, lines 6-7:
"to the router intercepting device for transmission to the first mobile device" should read -- to the intercepting device for transmission to the mobile device --.

Claim 10, column 25, line 31:
"for the mobile device, the mobile internet gateway" should read -- for the mobile device, the internet gateway --.

Claim 15, column 26, line 13:
"the first mobile device processor for execution" should read -- the mobile device processor for execution --.

Claim 20, column 26, line 29:
"policypre-runtime security protection" should read -- policy pre-runtime security protection --.

Signed and Sealed this
Tenth Day of February, 2015

Michelle K. Lee
*Deputy Director of the United States Patent and Trademark Office*